United States Patent [19]

Capewell et al.

[11] 4,210,846

[45] Jul. 1, 1980

[54] INVERTER CIRCUIT FOR ENERGIZING AND DIMMING GAS DISCHARGE LAMPS

[75] Inventors: Dennis Capewell, Easton; David G. Luchaco, Macungie; Joel S. Spira, Allentown, all of Pa.

[73] Assignee: Lutron Electronics Co., Inc., Coopersburg, Pa.

[21] Appl. No.: 966,643

[22] Filed: Dec. 5, 1978

[51] Int. Cl.[2] .................... H02M 7/515; H05B 41/29; H05B 41/39

[52] U.S. Cl. ...................................... 315/121; 363/96; 315/122; 315/197; 315/199; 315/127; 315/DIG. 4; 315/DIG. 5

[58] Field of Search .................. 363/96; 315/121, 122, 315/95-97, 194, 197, 199, 127, 105, 209, DIG. 4, DIG. 5

[56] References Cited

U.S. PATENT DOCUMENTS

| | | | |
|---|---|---|---|
| 3,422,309 | 1/1969 | Spira et al. | 315/194 |
| 3,619,716 | 11/1971 | Spira et al. | 315/105 X |
| 3,663,940 | 5/1972 | Schwarz | 363/28 |
| 3,731,142 | 5/1973 | Spira et al. | 315/209 R X |
| 3,753,071 | 8/1973 | Engel et al. | 315/201 |
| 3,824,428 | 7/1974 | Spira et al. | 315/105 |
| 3,919,592 | 11/1975 | Gray | 315/199 |

*Primary Examiner*—Alfred E. Smith
*Assistant Examiner*—Charles F. Roberts
*Attorney, Agent, or Firm*—Ostrolenk, Faber, Gerb & Soffen

[57] ABSTRACT

An illumination control system for gas discharge lamps which can be dimmed is provided in which a central inverter produces a sinusoidal output voltage at about 23 kHz. The amplitude of the inverter output is adjustable to dim the lamps. A transmission line consisting of spaced wires having respective thick insulation sheaths distributes the high frequency power to remotely located assemblies of ballasts and lamps. The ballasts consist of passive linear components. A high power factor rectifier network is disclosed for providing a d-c input to the inverter from the 50/60 Hz mains. The inverter circuit is provided with novel controls for gradual start-up and turn-off and is protected against load fault currents and internal fault currents. Automatic and manual resets are provided for internal fault current and load fault current, respectively. The basic inverter circuit consists of two alternately conducting controllably conductive power switching devices. Each is in parallel with a respective oppositely poled diode. The input d-c power line is connected in series with the series-connected power switching devices. A single series tuned circuit is connected in series with an output circuit element and is connected across one of the power switching devices. The amplitude of the inverter output is controlled by adjusting the phase at which the power switching devices turn on. In another embodiment, a single power switching device is used for the inverter circuit.

40 Claims, 18 Drawing Figures

FIG. 4
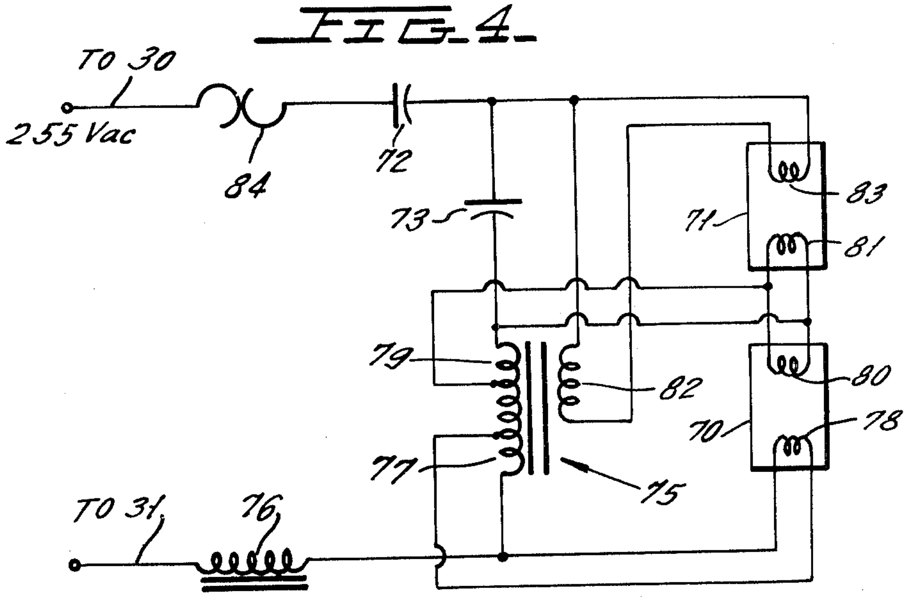
FIG. 5
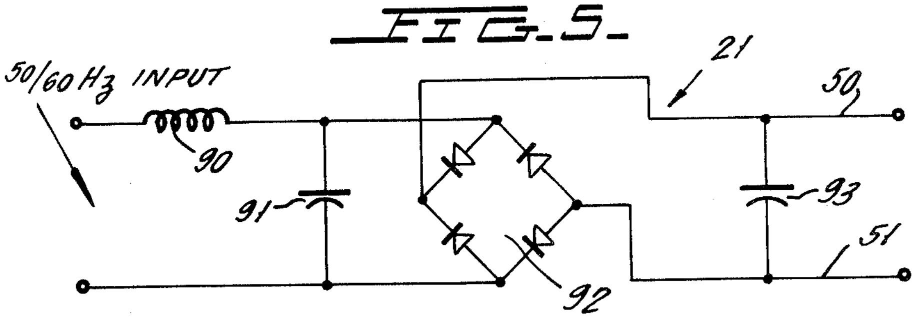
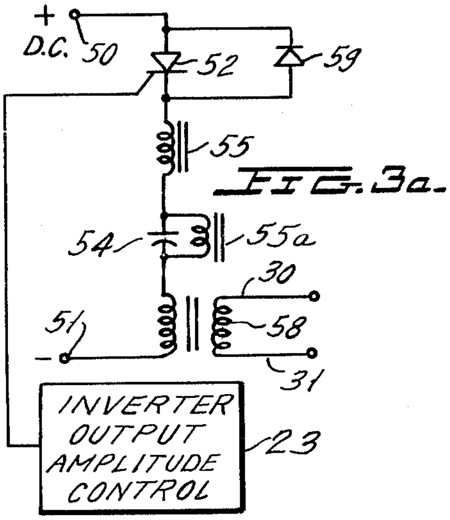
FIG. 3a
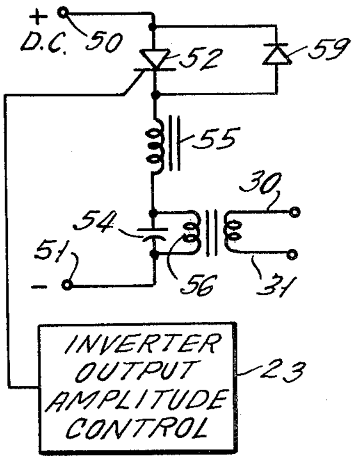
FIG. 3b

INVERTER CIRCUIT FOR ENERGIZING AND DIMMING GAS DISCHARGE LAMPS

RELATED APPLICATIONS

This application is related to copending applications Ser. No. 966,604, filed Dec. 5, 1978, in the name of Spira et al, entitled SYSTEM FOR ENERGIZING AND DIMMING GAS DISCHARGE LAMPS; Ser. No. 966,603, filed Dec. 5, 1978, in the name of Capewell, entitled D-C POWER SUPPLY WITH HIGH POWER FACTOR; Ser. No. 966,601, filed Dec. 5, 1978, in the names of Spira et al, entitled BALLAST STRUCTURE FOR CENTRAL HIGH FREQUENCY DIMMING APPARATUS, all of which are assigned to the assignee of the present invention.

BACKGROUND OF THE INVENTION

This invention relates to the energization of gas discharge lamps, and more specifically relates to a novel converter circuit for energizing and controlling the illumination output of gas-filled lamps and high intensity discharge lamps.

Illumination control systems are known and are shown in copending application Ser. No. 966,604, filed Dec. 5, 1978, entitled SYSTEM FOR ENERGIZING AND DIMMING GAS DISCHARGE LAMPS. This application is for an improved inverter for use with such systems.

To conserve energy in lighting applications using gas discharge lamps, it is known that the lamps should be energized from a relatively high frequency source, and that the lamps should be dimmed if their output light is greater than needed under a given situation. For fluorescent lamps, the use of a frequency of about 20 kHz will reduce energy consumption by more than about 20%, as compared to energization at 60 Hz. For high intensity discharge lamps, such as those using mercury vapor, metal halide and sodium, the saving in energy exists but is somewhat less than for a fluorescent lamp.

Energy saved by dimming gas discharge lamps depends on the degree of dimming which is permitted in a given situation. The light output of a lamp is roughly proportional to the power expended. Thus, at 50% light output, only 50% of the full rated power is expended.

Many applications exist where it is acceptable or desirable to decrease the amount of light from a lamp. For example, light in a building might be decreased uniformly or locally in the presence of sunlight coming through a window to maintain a constant or acceptable illumination at a work surface. Thus, during a normal work day, an energy saving of about 50% may be experienced. Light might also be decreased during nonworking hours and maintained at a low level for security purposes. Light output might also be decreased, either from local controls or from a generating station during periods of overload on the utility lines.

Energy savings may also be obtained by dimming lamp output when the lamps are new and have a light output much higher at a given input power than at the end of their life. Since a lighted area must be properly illuminated at the end of lamp life, energy can be saved by dimming the lamps when they are new, and then reducing the dimming level as the lamps age. Energy savings of 15% for fluorescent lamps and 20% to 30% for high intensity discharge lamps can be obtained in this fashion.

One system used at the present time to obtain the benefits of high frequency energization of gas discharge lamps distributes power at low frequency (60 Hz) to each of the fixtures of a lighting system. Each fixture could commonly contain several lamps in parallel or series connection. Each fixture is also provided with an inverter to produce the high frequency energizing power and contains the necessary ballast circuits for the lamp. Circuits used in the individual fixture for the above type circuit are typically shown in U.S. Pat. Nos. 3,422,309, 3,619,716; 3,731,142; and 3,824,428, each in the names of Spira and Licata; and 3,919,592 in the name of Gray, each of which is assigned to the assignee of the present invention. Systems of this type are available from the Lutron Electronics Co., Inc. of Coopersburg, Pa. under the trademark Hi-Lume.

While the above arrangement performs well, a complete inverter circuit and controls therefor must be placed in each fixture. Thus, the system is costly and the reliability problem is repeated for each fixture. Since each fixture receives the complete inverter circuit, designers and users are hesitant to use complex and expensive circuits and control schemes because of cost and reliability. Furthermore, each circuit exists in the hot, hostile environment of the lamp fixture. The scheme also requires that four leads go to each fixture; two for power and two for the dimming signal. A further problem is that it is difficult to provide a good 50 Hz to 60 Hz power factor in each fixture since the power factor correction devices are bulky and expensive.

In another known system, a single source of high frequency is used and provides energy for a relatively short distance over relatively short power lines. Dimming is obtained by changing the inverter frequency to a capacitive ballast.

This arrangement has several disadvantages. First it provides relatively poor dimming. The lamps used in the system require separate filament transformers since, if high frequency is used to power the filaments, it is difficult to keep the filament voltage constant with variable frequency. The separate filament transformers are costly and further complicate the system. It is also difficult to change the inverter frequency and requires costly and complex controls. A further problem of these systems is that the load on the inverter is capacitive so that the high frequency power factor is poor. Thus, excessive current flows in the wires between the inverter and ballast, creating additional energy loss.

Other arrangements are known in which 50 Hz to 60 Hz power is supplied from a local source directly to the lamps and their ballasts, and dimming is obtained by changing the current amplitude through the use of an auto-transformer or thyristor control circuit. While this system obviously does not have the advantage of high frequency excitation for the lamps, it is also true that bulky components are needed in this fixture and a good 50/60 Hz power factor is hard to obtain.

BRIEF DESCRIPTION OF THE INVENTION

In accordance with the present invention, a novel arrangement is provided wherein a central high frequency inverter is provided to energize a plurality of remote ballasts and associated gas discharge lamps with a symmetrical a-c output wave form. Circuits of any desired sophistication are provided for control of the central inverter and dimming is obtained by varying the amplitude of the inverter output. The connection from the inverter to the ballasts and lamps and remote fixtures is preferably by a novel low-loss transmission line consisting of a pair of spaced conductors which are each insulated by a very thick insulating sheath which minimizes their capacitive coupling to one another and to the grounded conduit in which they are located.

The ballasts used with the lamps are those which preferably use passive and linear components, but they could be active and non-linear. A passive ballast is defined herein as one using only resistors, inductors, transformers and capacitors. An active ballast is one using amplifier components such as transistors, thyristors, magnetic amplifiers, and the like. A linear component is one having a fairly linear relationship between input and output.

The output wave shape of the inverter of the invention is preferably a sinusoid, but other shapes which may be continuous and non-continuous and symmetric such as square waves, triangular waves and the like can be used. Non-symmetric wave forms and wave forms with a d-c component can also be used.

In order to maintain a high power factor, the rectifier network used in converting the frequency at the mains (50 Hz to 60 Hz) to a d-c input for the high frequency inverter is preferably that shown in copending application Ser. No. 966,603, filed Dec. 5, 1978, in the name of Dennis Capewell and assigned to the assignee of this invention. Moreover, the ballast circuits used in the fixtures are preferably those described in copending application Ser. No. 966,601, filed Dec. 5, 1978, in the name of Capewell et al and assigned to the assignee of this invention.

The single central inverter of this invention is designed with many features with high reliability. This is possible since all complexity is confined to a single unit rather than being repeated over many fixtures. The single inverter can be located to enjoy full air circulation and may be easily cooled. When dimming with a single inverter, all lamps track in intensity. Since dimming is obtained by inverter output amplitude control, simple, low cost and highly reliable equipment can be used in the fixture. Thus, the fixture for lamp and ballast has only a small number of small, highly reliable capacitive and inductive components.

The present invention provides a novel inverter circuit (or more generally, a converter circuit) which satisfies the following criteria when used as the centralized inverter or converter of an energy conserving dimming system:

1. The inverter produces a sine wave output wave shape which produces the lowest transmission line loss and also the least electromagnetic interference.

2. The inverter output amplitude can be varied for a dimming function.

3. The inverter is highly efficient to help reduce energy loss.

4. The inverter will operate at above audio frequency so that it will not generate audible noise.

5. The inverter can be reliably started up and turned off to insure:

(a) proper inverter operation, (b) proper lamp striking without excessive lamp voltage.

6. The sine wave shape output is retained with low distortion as load current changes due to dimming or a change in the number of lamps which are on.

7. The inverter is protected against load faults in the load circuit.

8. The inverter is protected against internal converter faults and is automatically reset after an internal converter fault.

In a preferred embodiment of the converter of the invention, a sine wave output is provided through the use of switching devices which produce a square wave output from a d-c input. The square wave output is then connected to an inductance-capacitance series circuit which is tuned to the output frequency of the inverter.

The switching devices are operated at the desired frequency by a novel control circuit which employs a synchronizing circuit which is timed by an input from a phase-sensitive zero crossing detector. The converter becomes a self-driven circuit which operates at the tuned frequency of the inductance-capacitance circuit connected to the switching devices.

A variable amplitude control circuit is then connected to the switching devices to delay the point in the phase at which the switching devices are turned on, thereby to control the conduction time within the cycle and thus, as will be seen, the output a-c voltage amplitude.

The variable amplitude control circuit is, in turn, controlled by several different control circuits. One control circuit is a dimming control circuit for changing the output amplitude of the converter to dim lamps in the circuit. A second control circuit controls the start-up and turn-off sequence of the switching devices to insure that they start and stop switching in proper synchronism with the load current. A further control is provided to control the lamp striking sequence by insuring that the lamp voltage increases slowly until the lamps strike. This causes reliable and non-destructive striking of the lamps.

Finally, several protective circuits are provided to prevent damage or unnecessary shutdown if there is a fault in the load circuit (which shuts off the circuit and requires manual reset) or if there is a fault in the converter (which permits automatic reset).

The basic switching circuit consists of two controllably conductive devices, preferably controlled rectifiers, for the power switching devices which are connected in series with a source of input power. Each of the power switching devices has an anti-parallel diode in parallel therewith. A single tuned circuit is then connected across one of the power switching devices and in series with the primary winding of an output transformer. The tuned circuit is tuned to resonate at the desired output frequency of the inverter. The power switching devices are turned on alternately and in synchronism with the resonant frequency of the tuned circuit. The output amplitude of the inverter output has a constant frequency, and is varied by phase-controlling the firing signals to the power switching devices.

An inverter circuit generally similar to the basic circuit described above is shown in U.S. Pat. No. 3,663,940 to Schwarz. However, the circuit of U.S. Pat. No. 3,663,940 requires two tuned circuits, one for each power switching device. Moreover, the output of the circuit of Schwarz produces a variable frequency when its output amplitude is varied. This is unacceptable for a lighting control circuit because of the ballasts which are designed to operate at a given input frequency.

Another inverter circuit generally similar to the one of this application is shown in the text *Principles Of Inverter Circuits,* Bedford and Hoft, John Wiley and Sons, N.Y. 1964, page 129. The circuit disclosed in the Bedford and Hoft text does not contain diodes across the main power switching devices and, therefore, does not obtain output amplitude variation with phase control, but obtains output amplitude variation by frequency control.

BRIEF DESCRIPTION OF THE DRAWINGS

FIGS. 3*a* and 3*b* show modified versions of the circuit of FIG. 3.

FIG. 4 is a circuit diagram of a ballast and lamp structure which can be used in the block diagram of FIG. 1.

FIG. 5 is a circuit diagram of a power supply rectifier which can be used with the present invention.

DETAILED DESCRIPTION OF THE DRAWINGS

The description of FIGS. 1 to 5 hereinafter is very similar to the description in copending application Ser. No. 966,604, filed Dec. 5, 1978.

Figure 1:
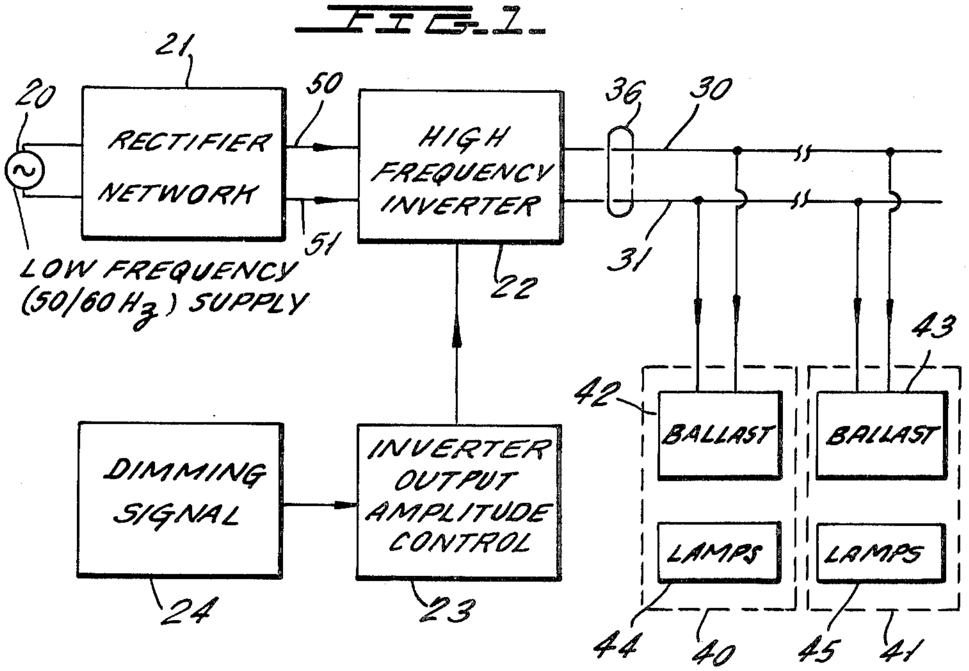
FIG. 1 is a block diagram showing the essential components of the system which uses the present invention.

Referring first to FIG. 1, there is shown a relatively low frequency (50/60 Hz) source 20 which is connected to a rectifier network 21 which produces rectified output power for a single central inverter 22. Rectifier network 21 may be of the type shown in FIG. 5 which will be later described, and which has high power factor characteristics. Inverter 22 will be later described as in connection with FIG. 3 and produces a sinusoidal a-c output wave shape at a frequency of about 23 kHz. The output of inverter 22 is preferably higher than about 20 kHz to be above the audio range, and can be as high as permitted by semiconductor switching losses, component losses, and the like which increase with higher frequencies. Note that if the apparatus is installed in an area where audio noise is not important, the inverter output need be higher than only about an order of magnitude greater than the input line frequency.

An inverter output amplitude control circuit 23 is connected to inverter 22 and, under the influence of a signal from dimming signal control device 24, will increase or reduce the amplitude of the wave shape of the high frequency output of inverter 22. The control device 24 can be a manual control or can be derived from such devices as photocell controls, time clocks, and the like which apply some desired condition responsive and/or temporal responsive control to inverter 22.

The output of inverter 22 is then connected to two leads 30 and 31 of a transmission line which is particularly well adapted to distribute the high frequency power output of inverter 22 over relatively long distances with relatively low loss. By way of example, the lines 30 and 31 could have a length of about 100 feet, and could supply power to about twenty-five discrete spaced fixtures which each might contain two lamps. In this use, 1850 watts must be provided to the system with a power factor of about 0.9.

Note that this installation could consist of fifty 40-watt fluorescent lamps which require 2500 watts at 60 Hz. Only 1850 watts are needed at the higher frequency and with the novel system of the invention for the same light output.

Note further that only two wires are needed to carry power to lamp fixtures with the present invention as contrasted to the need for four wires in fixtures which locally contain inverter circuits and are connected to easily transmitted low frequency (50/60 Hz) power.

Figure 2:
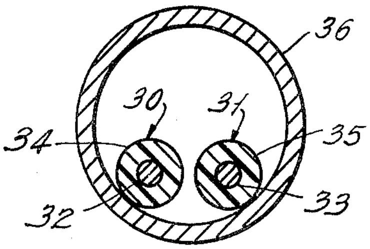
FIG. 2 is a cross-sectional view of a preferred transmission line for connecting the output of the inverter to the ballasts and lamps in FIG. 1.

FIG. 2 shows a preferred form of the novel transmission line of the invention for distribution of high frequency high power energy, as contrasted to well known arrangements for the distribution of high frequency, low power signalling voltages. In FIG. 2, lines 30 and 31 are formed of respective central conductors 32 and 33, respectively, which each consist of nineteen strands of copper wire having diameters of 0.014 inch. The outer diameter of the bundle of strands is about 0.070 inch. Each of conductors 32 and 33 are covered with dielectric sheaths 34 and 35, respectively, which may be of any suitable conventional insulation. Each of sheaths 34 and 35 have diameters of 0.235 inch and are preferably at least about three times the diameter of their respective central conductor. Strands 30 and 31 are then contained in a grounded steel conduit 36 which may be a so-called ¾ inch conduit which has an inner diameter of about 0.825 inch and an outside diameter of about 0.925 inch. The transmission lines 30 and 31 are confined in conduit 36 for a major portion of their lengths, as needed by the particular installation.

Note that the dimensions given above are only typical and that other dimensions could be selected. By using relatively thick insulation sheaths 34 and 35, the capacitive coupling and thus losses between conductors 32 and 33 and from the conductors 32 and 33 to conduit 36 are minimized. Thus the transmission line will have low loss qualities, even if it extends long distances. Note that any desired connection can be used if the distance from inverter 22 to its loads is short.

By using maximum thickness insulation sheaths 34 and 35 which can still be conveniently drawn through conduit 36, the electric field intensity is reduced, thereby to reduce bulk loss resistivity. In the past, it was believed necessary to use a minimum dielectric thickness to minimize dielectric volume and thus dielectric loss. The present invention departs from this conventional approach in order to reduce the shunt capacitive losses between the wires and from the wires to the conduit.

The relatively thick insulation sheaths 34 and 35 also minimize magnetic field losses incurred by coupling with the ferrous metal conduit. The lower magnetic loss is due to the greater distance of the conductors 32 and 33 from the ferrous metal conduit. The magnetic field varies inversely as the distance from a conductor. Energy losses due to the presence of ferrous metal in a magnetic field vary directly as a square of the magnetic field intensity. Therefore, it is seen that these losses vary inversely as the square of the distance between the conductors and the ferrous metal conduit. This permits use of ferrous conduits, rather than aluminum or other non-ferrous materials. Preferably, the characteristic impedance of the transmission line should be matched to that of the load to reduce the VAR loss and variation in voltage along the line.

The transmission line conductors 30 and 31 extend through a building or along a roadway, or the like, and are connected to one or more remote fixtures. Two fixtures 40 and 41 are shown for illustration purposes, but any number can be used. Fixtures 40 and 41 each contain ballasts 42 and 43, respectively, and associated gas discharge lamps 44 and 45, respectively. A typical ballast and lamp assembly will be later described in connection with FIG. 4. Lamps 44 and 45 may be fluorescent or high intensity gas discharge lamps or any other desired type of gas discharge lamp. Ballasts 42 and 43 preferably use passive linear components such as reactors (of relatively small size because of the relatively high frequency applied to the ballast) and capacitors which are reliable and inexpensive. Note that in a prior high efficiency 60 Hz ballast, there was a ballast loss of about 12 watts in the fixture so that the fixture is quite hot. With the present invention, the ballast loss in the fixture is less than 1 watt. Thus the components in the ballast are not subject to high temperature.

In operation, high frequency power (above about 20 kHz) is transmitted from inverter 22 over the transmission lines 30–31 with relatively low loss and is distributed to the plurality of remotely located and simple and reliable ballasts 42 and 43 and their associated lamps 44 and 45, respectively.

In order to dim the output of all the lamps 44 and 45 in an identical manner, a signal from signal source 24 (which can be a manual control, a clock control, a control from the electric utility to control utility loading, a sunlight intensity responsive control, or the like) causes the inverter output amplitude control circuit to reduce the output amplitude of the a-c output of inverter 22. The light output of lamps 44 and 45 will then decrease roughly proportionally to the reduction in power from inverter 22.

Figure 3:
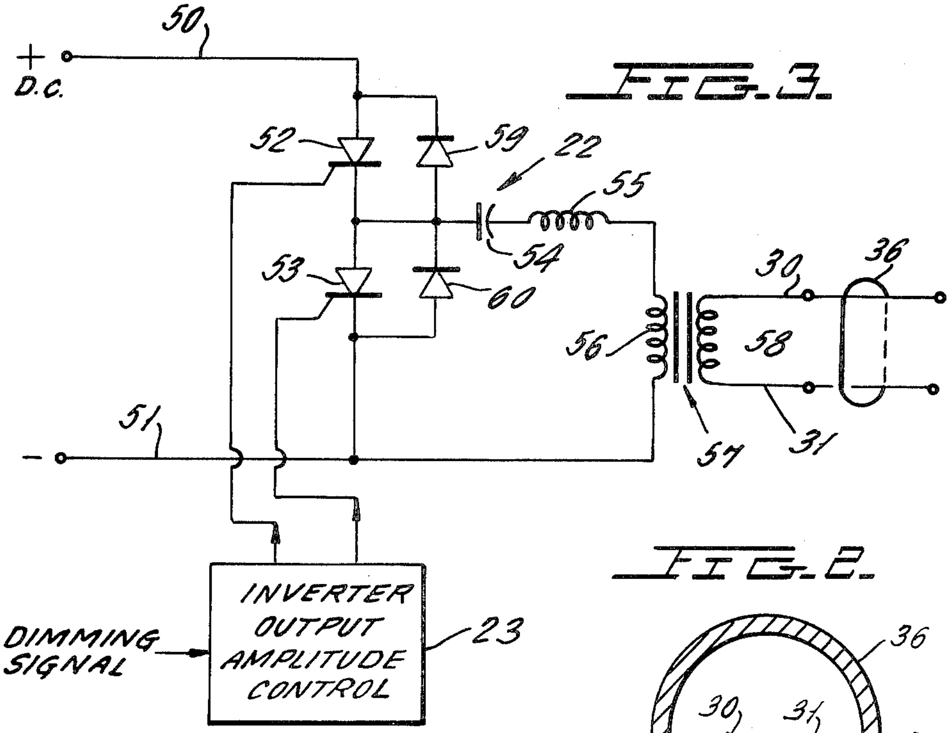
FIG. 3 is a circuit diagram of the basic inverter circuit of the invention and which can be used in the diagram of FIG. 1.

Any desired inverter circuit having a variable output can be used for the inverter 22. FIG. 3 shows a novel circuit of the inverter of the invention. A circuit similar to that of FIG. 3 is shown in the pulication *An Improved Method of Resonant Current Pulse Modulation For Power Converters,* Francisc C. Schwarz, IEEE Transactions, Vol. IEC 1–23, No. 2, May, 1976; and is also shown in U.S. Pat. No. 3,663,940 to Francisc Schwarz. That circuit, however, does not obtain variable amplitude adjustment with constant frequency as in the case of the present invention.

In FIG. 3, the d-c output of rectifier 21 is applied between d-c positive bus 50 and the negative or ground bus 51 which are connected across series-connected, high speed thyristors 52 and 53. Thyristors 52 and 53 have turn-on speeds of less than about 1 microsecond and turn-off speeds of about 2 to 3 microseconds. The junction between thyristors 52 and 53 is connected to series-connected capacitor 54, inductor 55, the primary winding 56 of a step-up transformer 57 and the ground bus 51. Transformer 57 has a high voltage secondary winding 58 which delivers a high frequency sinusoidal output voltage of about 255 volts a-c for a d-c input voltage of about 320 volts.

Suitable bypass diodes 59 and 60 are connected across thyristors 52 and 53, respectively. Capacitor 54 and inductor 55 have values chosen to be resonant at about 23 kHz. Thus, capacitor 54 may have a value of 0.33 microfarads and inductor 55 may have a value of about 130 microhenrys.

Amplitude control circuit 23 provides timed output gate pulses to thyristors 52 and 53 to control their operation, and these pulses are phase-controlled by the dimming signal.

In operation, and to start the inverter, consider that both thyristors 52 and 53 are off. A gate pulse from control 23 first turns on thyristor 52 to create a current path through components 50, 52, 54, 55, 56 and 51. The gate pulse to thyristor 52 is removed after a few microseconds and when conduction of thyristor 52 is fully established. Since capacitor 54 and inductor 55 are resonant at about 23 kHz, the current in the above circuit goes through a half cycle at the resonant frequency and, when it comes close to zero, thyristor 52 is commutated off, and the current reverses and flows through the path 51, 56, 55, 54, 59 and 50.

At this point, a pulse from control 23 turns on thyristor 53 so that the resonant current (and energy stored in the resonant circuit) can now reverse and flow through the circuit including components 53, 56, 55 and 54 in a resonant half cycle. The triggering pulse from circuit 23 is removed after conduction is established in thyristor 53. Thus, when the current at the end of this negative half cycle approaches zero, the thyristor 53 is commutated off and the current reverses into the positive half cycle and flows through components 60, 54, 55 and 56. The next pulse from control 23 turns on thyristor 52 as the resonant current swings into its positive half cycle to complete a full cycle of operation.

Obviously, a high output voltage is induced into output winding 58 during this operation which is subsequently applied to the transmission line consisting of conductors 30 and 31.

Amplitude variation is obtained by delaying the application of the firing signal to thyristors 52 and 53 and thus varying the duty cycle of the inverter. Thus, the conduction time of the thyristors, during the half cycle, is reduced and less voltage is applied to the primary winding 56. However, the voltage to winding 56 is sinusoidal due to the resonance of capacitor 54 and inductor 55. Thus the voltage fed to ballasts 42 and 43 (FIG. 1) is also sinusoidal. Amplitude variation may be obtained by variable delay of the firing signal to either or both thyristor switches.

As will be later described, the ballasts 42 and 43 are tuned to the output frequency of inverter 22. The sinusoidal wave form reduces inefficiency due to harmonics and also reduces production of electromagnetic interference. However, non-sinusoidal, a-c wave forms can also be used with the invention.

While some aspects of the particular inverter circuit of FIG. 3 are known, it was never previously used for gas discharge lamp control purposes nor did prior circuits provide constant frequency, variable amplitude output in response to phase control. The circuit was not used previously in lamp applications because, in ordinary gas discharge lamp applications, the lamps would go out if the voltage input is reduced. However, in the present invention, the lamps stay on and dim as input voltage amplitude is decreased because the lamps are operated at high relatively constant frequency and are provided with suitable ballasts.

FIG. 3*a* shows a modified version of the circuit of FIG. 3 where the thyristor 53 and diode 60 have been removed from the circuit. An inductor 55*a* is added in parallel with capacitor 54. FIG. 3*b* also shows a modified version of the circuit of FIG. 3 where the thyristor 53 and diode 60 have been removed. In FIG. 3*b*, however, transformer primary 56 is in parallel with capacitor 54. A circuit similar to that of FIGS. 3*a* and 3*b* is disclosed by M. Ramamoorty in *IEEE Transactions On Industrial And Control Instrumentation*, February 1976, pages 103–104. However, that circuit does not contain a flyback diode 59 so that in order to produce variable amplitude output it is necessary to vary the frequency of the output.

The addition of diode 59 allows the circuit to achieve variable amplitude output at a relatively constant frequency. These novel circuits are somewhat similar to that described in Mapham, *Low Cost Ultrasonic Frequency Inverter Using Single SCR*, IEEE Transactions Vol. I GA-3, No. 5, September/October 1967. The present invention does not require a diode in series with the output transformer primary as taught by Mapham, because the output frequency of the novel circuit of the present invention remains relatively constant.

One typical ballast arrangement shown in FIG. 4 is provided for each of ballasts 42 and 43 and is the subject of copending application Ser. No. 966,601, filed Dec. 5, 1978, referred to above. The ballast of FIG. 4 is used for two series lamps 70 and 71 (equivalent to lamps 44 in fixture 40 of FIG. 1), where lamps 70 and 71 are rapid-start fluorescent lamps which are very suitable for dimming. Other gas discharge lamps could have been used.

The ballast circuit for the lamps 70 and 71 includes capacitors 72 and 73, transformer 75 and inductor 76. A winding tap 77 is connected to filament 78 of tube 70. A winding tap 79 is connected to filaments 80 and 81 of tubes 70 and 71, respectively. A winding 82 is connected to filament 83 of tube 71. Transformer 75 has a primary winding of about 235 turns. Taps 77 and 79 and winding 82 may be about 9.5 turns. A conventional thermally responsive switch 84 which opens, for example, at 105° C. is in series with capacitor 72.

The values of capacitors 72 and 73 and inductor 76 are chosen to be resonant at about 32 kHz while capacitor 72 and inductor 76 resonate close to about 12 kHz. Therefore, the reactive impedance of inductor 76 is greater than that of capacitor 72 at 23 kHz. By way of example, capacitor 72 is 0.033 microfarad; capacitor 73 is about 0.0047 microfarad; and inductor 76 is about 5.1 millihenrys.

The ballast circuit described above has the following desirable characteristics:

1. It will not be damaged by accidental application of 50 Hz to 60 Hz power.

2. The inverter 22 will not be shorted if any one ballast component fails. Thus, the short circuit can be located more easily since the lamps in unshorted fixtures are still on.

3. The circuit exhibits a good power factor to the inverter 22 and transmission lines 30–31.

4. There is a relatively constant filament voltage over the dimming range to avoid damage to lamps.

5. The starting voltage is sufficiently high to strike the lamps under specified conditions but is not so high that the lamps can be damaged.

6. The ballast is small and efficient because the ballast transformer only handles the filament power of the lamps.

The operation of the circuit of FIG. 4 is as follows: When a-c power is applied to lines 30 and 31, the 23 kHz power causes components 72, 73 and 76 to partially resonate at their resonant frequency of 32 kHz. The increase in current flow due to this partial resonance causes the voltage on capacitor 73 to rise high enough to start lamps 70 and 71. The partial resonance is important since it affords sufficient but not excessive starting voltage which might damage lamps 70 and 71. Once lamp 71 starts, capacitor 73 is essentially shorted so that capacitor 72 and inductor 76 are resonant below the inverter frequency.

During operation, capacitor 72 blocks low frequency voltage of from 50 Hz to 60 Hz, if that voltage is accidentally applied to lines 30 and 31. Thus, accidental destruction of the ballast by low frequency power is prevented. Also, since impedance components including capacitors 72 and 73, transformer 75 and inductor 76 are connected in series, the failure of any one component will not appear as a short on the inverter 22. Thus, all lamps of all fixtures are not extinguished and the faulty component can be easily located.

Good power factor is obtained with the circuit of FIG. 4 by making the impedance of capacitor 72 close to that of inductor 76 at 23 kHz. Since the reactive impedances of components 72 and 76 subtract, the resultant is small compared to the series resistance of lamps 70 and 71. Thus, the reactive component of the load is small so that good power factor is obtained.

A relatively constant filament voltage for filaments 78, 80, 81 and 83 is assured since the primary winding of transformer 75 is connected across lamp 70. The voltage drop across this lamp is relatively constant even as the lamp is dimmed. Thus, the filament voltages remain approximately constant. Note, however, that as the amplitude of the input voltage from lines 30 and 31 is varied, the current in lamps 70 and 71 varies and the light output of the lamps varies.

The inductor 76, in addition to being a component of the power factor network, has a larger reactive impedance than capacitor 72, and thus acts as a ballasting impedance to limit current in lamps 70 and 71.

Although the arrangement of FIG. 4 shows the invention in connection with fluorescent lamps, it should be understood that the invention can be applied to the energization and dimming of any gas discharge lamp. Indeed, the invention can be used to operate and dim incandescent lamps if desired to give a user of the circuit flexibility of application. If one or more incandescent lamps are used in place of lamps 70 and 71, the ballast circuit can, of course, be eliminated.

Lamps 70 and 71 in FIG. 4 could be replaced by conventional high intensity discharge lamps, such as mercury vapor, metal halide, and high and low pressure sodium lamps. These lamps do not have filaments and are relatively immune to damage from too high a striking voltage. Thus, the ballast of FIG. 4 can be modified to remove the transformer 75 and its filament heater windings when applied to a high intensity discharge lamp.

The circuit of FIG. 4 can also be modified to place the inductor 76 across the lamp terminals in a well known circuit arrangement. With the transformer 75 removed, the capacitor 72 is designed to block 60 Hz power and to prevent shut-down of the system in case of a shorted component. Resonance is established between the inductor 76 and the capacitors in series therewith near the driving frequency of the inverter 22. Thus, before the H.I.D. lamp strikes, the circuit has a high Q and a large voltage builds up across the lamp. This provides sufficient voltage to strike the lamp arc, and the lamp becomes a lower impedance, more nearly matched to the ballast. The ballast then regulates the lamp arc current as a function of the ballast input voltage.

Any suitable ballast circuit could be used with the H.I.D. lamp where, however, the ballast is subject to an energy-conserving dimming operation.

FIG. 5 shows a rectifier network circuit 21 which can be used with the present invention, and which has the advantage of having a high power factor so as not to place an unnecessarily high current drain on the 50/60 Hz wiring leading to the rectifier network 21.

Copending application Ser. No. 966,603, filed Dec. 5, 1978, in the name of Dennis Capewell, and assigned to the assignee of this invention, is incorporated herein by reference, and contains a detailed description of the operation of the circuit of FIG. 5.

The circuit consists of a resonant circuit including inductor 90 and capacitor 91 connected between the input low frequency a-c source and the single phase, bridge-connected rectifier 92. The d-c output of rectifier 92 is then connected to an output capacitor 93, which may be an electrolytic capacitor, and to the positive bus 50 and ground bus 51. The values of inductor 90 and capacitor 91 are critical and are 30 millihenrys and 10 microfarads, respectively.

A detailed analysis of the circuit operation is disclosed in above-noted copending application Ser. No. 966,603. In general, and in operation, the LC circuit 90–91 in front of rectifier 92 causes the current drawn from the 50/60 Hz input to flow for a longer time during each half cycle and to have a better phase relationship with the voltage. The inductor 90 and capacitor 91 are resonant at a period of about one-fourth of the period of the input circuit frequency (usually 50 Hz to 60 Hz). At one point in the cycle, the voltage on capacitor 93 exceeds the voltage on capacitor 91. This back-biases rectifier 92 so that line current will surge into capacitor 91 rather than cutting-off. The surging of current into capacitor 91 during reverse-biasing of rectifier 92 causes inductor 90 and capacitor 91 to resonate, thereby causing more uniform current flow from the a-c mains over each half cycle, and thereby substantially improving power factor.

It is understood that the system shown herein can also be realized with inverter 22 as a multi-phase inverter such as a three-phase inverter. In this case, the high frequency power will be distributed to ballasts and lamps by means of multi-conductor transmission line, e.g. three conductors for three-phase power. The ballasts and lamps would be connected conductor-to-conductor, or conductor to neutral, if a neutral is provided. Likewise, the low frequency 50/60 Hz supply 20 in FIG. 1 can be a multi-phase supply, e.g. three phase.

An important feature of this invention is the use of a single central inverter transformer 57 to supply the proper starting voltage to the lamps. This feature improves the efficiency of the system. In the conventional system, a transformer is contained in each fixture to supply proper starting voltage. It is well known to transformer designers that for a given volt-ampere size, one large transformer is more efficient than a number of smaller transformers.

The inverter transformer 57 supplies the proper starting voltage and the transformers 75 in the fixture ballasts (FIG. 4) does not have to carry full lamp power, but only carries filament power. All lamp power is supplied from the single inverter transformer 57 of FIG. 3 which is more efficient than an aggregate of smaller transformers for each ballast and for the same total volt amperes rating. Thus higher system efficiency is obtained.

Furthermore, since the ballast transformers 75 only carry filament power, the fixture ballasts are smaller, cooler, lighter, more efficient, less complex and thus more reliable than ballast transformers which must carry the full lamp power.

The ballasts will generate approximately an order of magnitude less heat than those in which lamp volt amperes must be handled by the ballast transformer. Therefore the fixture temperature is considerably lower. When fluorescent lamps are run at this resultant cooler temperature, their light output for a given input power (efficacy) increases. This effect can save an approximate additional 5% in power in a given system.

In addition to the gain in efficiency by the use of a central transformer 57, the heat produced by the lamp power volt-amperes is dissipated in the central inverter transformer 57 rather than in the individual fixtures. The central inverter transformer 57 can be efficiently cooled since it will be in a convenient and accessible location, and any desired cooling can be used.

One specific inverter or converter structure which generally follows the concepts of the arrangement shown in FIG. 3 is described in connection with FIGS. 6 to 12. In FIGS. 6 to 12, however, it will be observed that novel control configurations are provided for the circuit of FIG. 3 which enable the circuit to be uniquely applicable to a variable power output type of system such as a lamp dimming system where the inverter is the central high frequency supply for a plurality of lamp loads which are connected to the supply over a transmission line or the like.

The inverter to be described in FIGS. 6 to 12 will satisfy the following criteria:

1. The converter output will be a sine wave which is believed to be the best for the lowest transmission line loss.
2. The output amplitude of the sine wave output of the converter is variable in order to obtain dimming.
3. The inverter operates with high efficiency, thereby to save energy.
4. The output frequency of the inverter can be greater than about 20 kHz and above the audio range so that the converter will not generate annoying audible noise when used in an environment susceptible to an audio noise problem.
5. The converter can be reliably started up and turned off with the switching devices of the inverter being immediately operated in order to insure proper converter operation and to insure proper lamp striking.
6. The inverter sine wave output has low distortion even though there is a relatively large change in the load current due, for example, to dimming or a change in the number of lamps in the system which are conducting load current.
7. The converter is protected against fault load current and is turned off and requires an intentional operation by the user to turn it back on if a load fault is developed.

8. The converter is internally protected with automatically reset means for temporarily turning off the converter upon the occurrence of an internal converter fault and then automatically returning the converter to duty.

Figure 6:
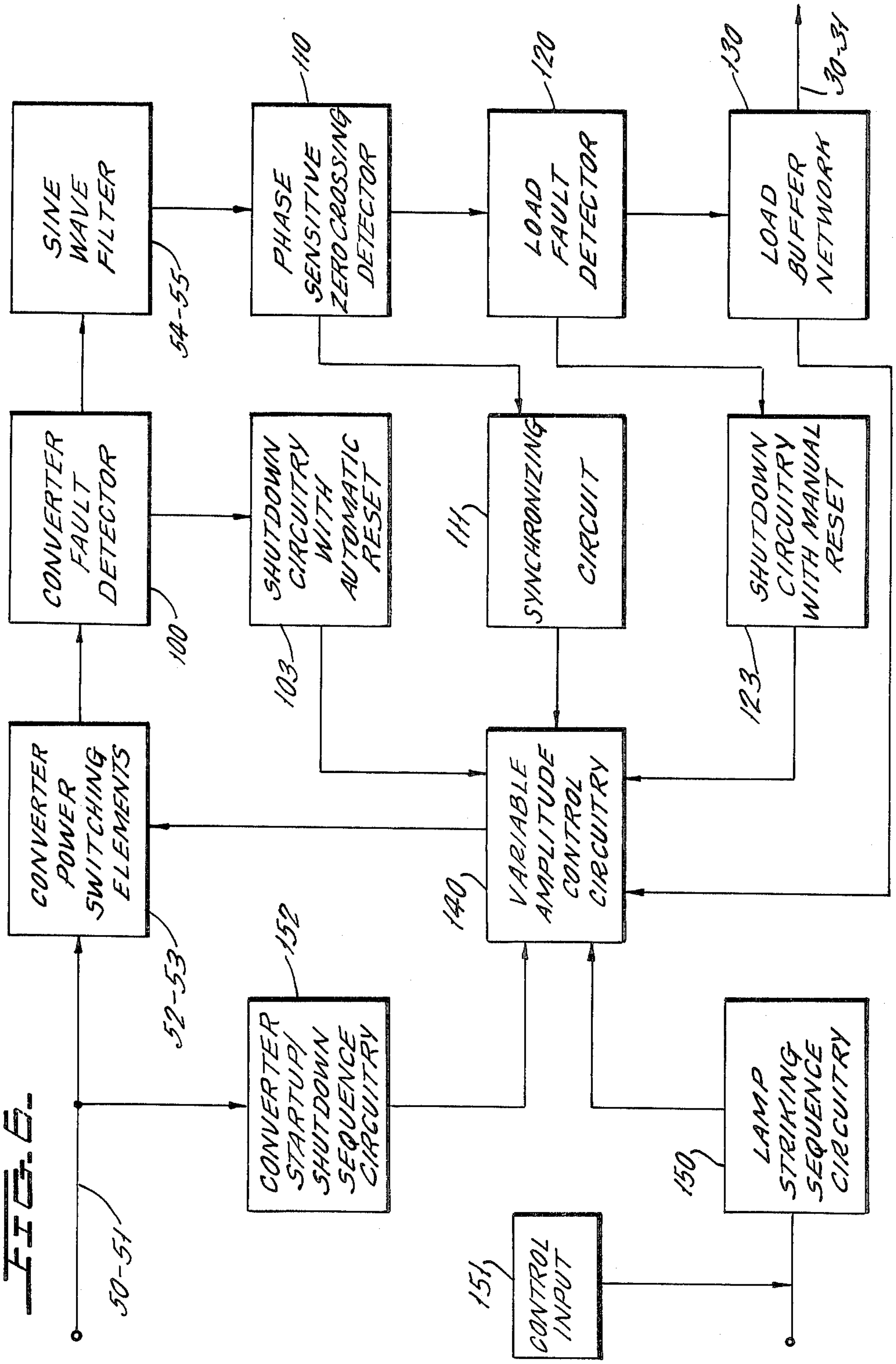
FIG. 6 is a block diagram of an inverter circuit incorporating several features the invention.

FIG. 6 is a block diagram of the novel converter of the invention. In FIG. 6, input power at lines 50–51 are connected to the block 52–53 labeled CONVERTER POWER SWITCHING ELEMENTS. These power switching elements could be the thyristor switching devices 52 and 53 of FIG. 3 (and their associated diodes 59 and 60 respectively) or could be any other desired type of switching element including transistors and the like.

The circuit including switching elements 52 to 53 contains a converter fault detector circuit 100 which is operable to produce an output signal in response to a fault within the converter. By way of example and as shown in FIG. 7 which is similar to the circuit of FIG. 3 but wherein other load circuit components have been added, the fault detector 100 could consist of a current transformer 101 whose output winding is connected to a load resistor 102 which produces a suitable output to a shut-down circuit system 103 (FIG. 6) which will be later described.

The main current carrying circuit next contains the sine wave filter 54–55 consisting of previously described components 54 and 55 and which insures that the square wave input from the converter power switching elements 52 and 53 is converted to a sine wave with low distortion. This is obtained because, at the fundamental frequency, the sum of the impedances of inductor 55 and of capacitor 54 is zero, so that the fundamental frequency of the square wave is unattenuated. However, the total impedance of the tuned circuit 54–55 is different from zero for other frequency components which form the input square wave and these frequency components are greatly attenuated. Consequently, a relatively low distortion sine wave output is produced by the converter circuit in view of the tuned circuit including capacitor 54 and inductor 55. Moreover, the frequency of this circuit is chosen above the audible range and preferably is greater than 20 kHz so that both criterion 1 and 4 above are met.

The load circuit in FIG. 6 is next connected through a phase-sensitive zero crossing detector circuit 110 which is operable to time the operation of a synchronizing circuit 111 which will be later described in connection with FIG. 8. The phase-sensitive zero crossing detector can consist of any desired type of circuit. One circuit is shown in FIG. 7 as consisting of the saturable core transformer 112 which is saturated during most of the positive and negative half cycles and is unsaturated only for a short time during each current zero interval. Thus, an output voltage pulse is produced on the secondary winding 113 and across the load resistor 114 each time the main converter current passes through zero.

Figure 7:
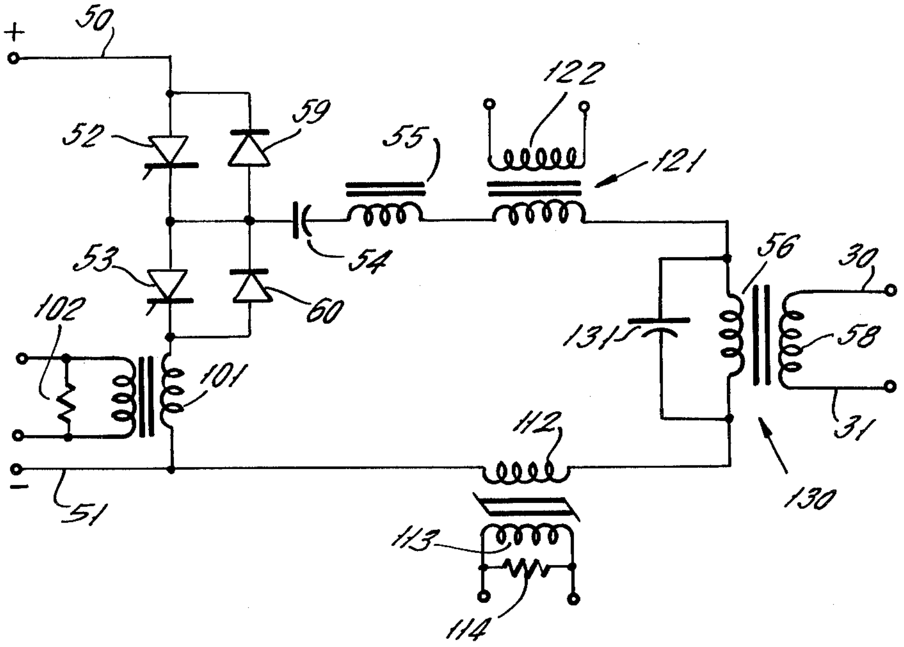
FIG. 7 is a circuit diagram similar to FIG. 3 but contains further control circuit components in the main current carrying circuit.

An important aspect of the location of transformer 112 is that it is located in the resonant circuit portion of the circuit of FIG. 7, rather than directly in the circuit with controlled rectifier 52 or diode 59. Thus, in the circuit with controlled rectifier 52, the transformer would be exposed to large transients or noise that would produce false zero current signals. If the transformer 112 were directly connected in series with diode 59, it would cause premature commutation of the SCR 52. However, by placing transformer 112 in the resonant circuit, the proper synchronism of the inverter with the current in the resonant circuit is insured.

The main load current circuit then also includes a load fault detector circuit 120 which is shown in FIG. 7 as the load current transformer 121 having a secondary winding 122 which has an output connected to a suitable shut-down circuit system 123 (FIG. 6) which will be later described in connection with FIG. 12.

The main load circuit next includes a load buffer network 130 which is shown in FIG. 7 as consisting of the voltage transformer 56–58 and a capacitor 131 which tends to overpower large values of resistance which might appear due to a very light load, and preserves the sine wave configuration of the output. Thus, in the circuit of FIG. 3, which does not contain the capacitor 131, if the load resistance becomes too large, the circuit becomes over-damped and the voltage across the load is no longer a sine wave and the resonance of members 54 and 55 ceases. Capacitor 131 presents an added resonating component which is in parallel with the load and is used to preserve criteria 7 listed above.

The block diagram of FIG. 6 contains considerable control circuitry which can be conveniently constructed and adjusted for use with a single central inverter and which would be very expensive to reproduce at each fixture of a fluorescent lamp system. Thus, the circuit of FIG. 6 includes a variable amplitude control circuit 140, which will be later described in connection with FIG. 9, and which receives an input from the synchronizing circuit 111. The variable amplitude control circuit is used to change the switching point of the power switching elements 52 and 53 (to obtain phase control) and is controlled from several inputs. These include the shut-down circuit 103 which is operated from the converter fault detector and the shut-down circuit 123 which is operated from the load fault detector 120. Circuit 140 is also controlled by a lamp striking sequence circuit 150 which will later be described in connection with FIG. 11, or from a manual control input 151 which operates through the lamp striking sequence circuit 150. A start-up and shut-down sequence control circuit 152 is also provided which will be later described in connection with FIG. 10.

Figure 8:
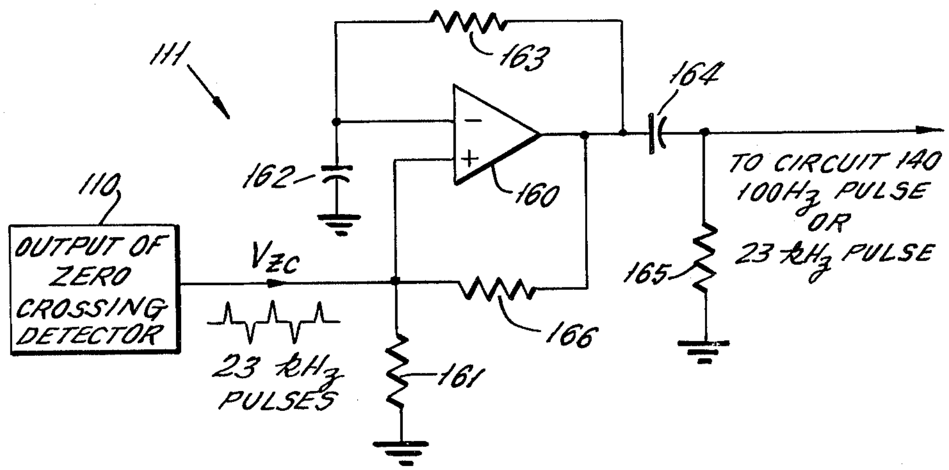
FIG. 8 is a circuit diagram of the synchronizing circuit of FIG. 6.

The synchronizing circuit 111 is shown in FIG. 8 and consists of an oscillator formed by a comparator 160 which has one input connected to the output voltage $V_{ZC}$ of zero crossing detector 110. The same input is connected to ground through resistor 161 and to the output of comparator 160 through resistor 166. The other input of comparator 160 is connected to capacitor 162 and resistor 163. Resistor 163 is connected to the output of comparator 160 and to the differentiating circuit consisting of capacitor 164 and resistor 165. The comparator circuit is so designed that its free running output frequency is about 100 Hz.

The output of synchronizing circuit will be either a 23 kHz pulse or a 100 Hz starting pulse train needed to start the inverter circuit.

More specifically, the operation of the circuit of FIG. 8 is as follows:

When the converter is off, there is no output from the zero crossing detector 110. Therefore, the comparator circuit 160 applies a free-running output voltage to differentiator 164–165. The differentiator then produces pulses (for starting the inverter) at 100 Hz which are fed to the variable amplitude circuit of FIG. 9.

If the converter is turned on by one of the 100 Hz pulses, the zero crossing detector is activated and thus 23 kHz pulses appear at the output of circuit 110. These 23 kHz pulses then cause the free-running nature of the comparator circuit to be overridden. Therefore, 23 kHz pulses are now applied to the variable amplitude circuit 140. These pulses are synchronized with the frequency of the main current so that the converter is a self-driven type of circuit. Since the converter of FIGS. 6 and 7 is now self-driven, components 54 and 55 are tuned to their natural resonant frequency so that there is no net voltage drop across these components. Thus, no extra volt amperes have to be supplied to the circuit to overcome the drop of these components and the efficiency of the circuit is high.

If the inverter starting operation is unsuccessful, the 23 kHz pulse from detector 110 in FIG. 8 disappears. Thus, once again the comparator circuit will free run at 100 Hz and again the 100 Hz pulses attempt to start the inverter. This continues until the inverter is started.

Figure 9:
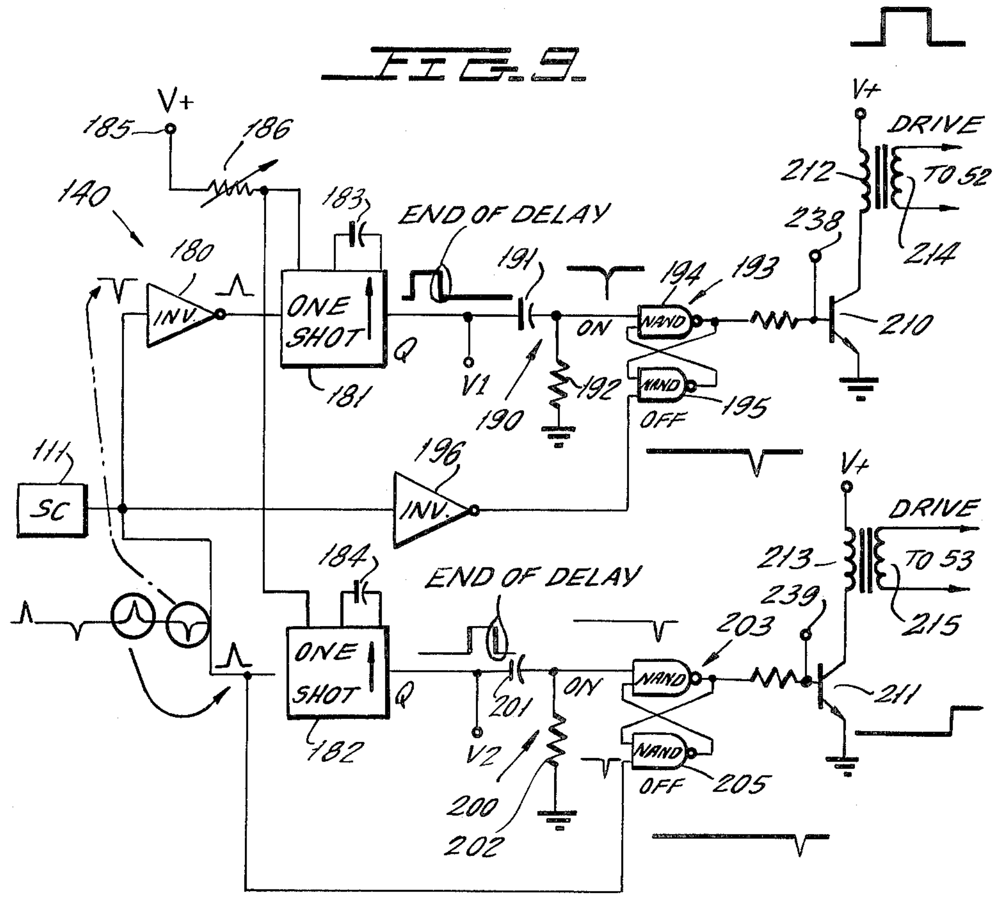
FIG. 9 is a circuit diagram of the variable amplitude control circuit of FIG. 6.

Turning next to FIG. 9, there is described the novel variable amplitude control circuit which is used in accordance with the invention to control the point in the phase at which the power switching elements 52 and 53 are actuated, thereby to control the output amplitude of the converter. The synchronizing circuit 111 of FIG. 8 produces an output which consists of the train of pulses shown in FIG. 9. These pulses, which mark the zero crossover point for the positive and negative current loops of the circuit of FIG. 7 are applied to an inverter 180 and a monostable multivibrator (one-shot) 181. They are also applied directly to the one-shot 182. Each of one-shots 181 and 182 have timing capacitors 183 and 184, respectively.

The source of control voltage V+ is connected to terminal 185 and through an adjustable resistor 186 to each of one-shots 181 and 182. Resistor 186 and capacitors 183 and 184 act as the time-out circuits of one-shots 181 and 182, respectively. Thus, by adjusting the potentiometer 186, it is possible to vary the length of the pulse outputs of the one-shots 181 and 182.

The output of one-shot 181 is then connected to the differentiator circuit 190, consisting of capacitor 191 and resistor 192, and the output of the differentiator 190 is connected to the latch 193 which consists of NAND circuits 194 and 195. The other input of latch 193 is connected through inverter 196 directly to the synchronizing circuit 111.

The one-shot 182 output is connected to differentiator circuit 200 which consists of capacitor 201 and resistor 202. The output of differentiator circuit 200 is connected to the latch 203 which consists of NAND circuits 204 and 205. Another output to the latch 203 is connected directly from the synchronizing circuit 111.

The output of latch 193 is connected to the base of transistor 210 while the output of latch 203 is connected to the base of transistor 211. Transistors 210 and 211 have their emitter-collector circuits connected in series with the voltage source V+ and transformer windings 212 and 213, respectively, which have output windings 214 and 215, respectively, which are connected to the gate-cathode circuits of thyristors 52 and 53, respectively.

The manner in which the thyristors 52 and 53 are turned on by the variable amplitude control circuit of FIG. 9 is as follows:

One-shots 181 and 182 set the delay between the point at which the main circuit current goes through zero and the time the next power device is turned on. Thus, phase control is achieved for the two devices. This delay is controlled by the setting of the potentiometer 186 or some equivalent control. A longer delay in turning on the power devices reduces their conduction time and, therefore, less power is sent to the load. Consequently, a lower main output voltage is achieved. The one-shots 181 and 182 are triggered by positive going pulses, and are therefore alternately triggered by respective alternate pulses from the synchronizing circuit. Thus, the devices 52 and 53 are turned on alternately and with proper phase relationship to the main current, with some given delay following the zero crossing instant of the main current as it passes through zero. Latch circuits 193 and 203 change state with a negative going pulse (produced by the trailing edge of the output of one-shots 181 and 182 respectively) to turn on transistors 210 and 211 at the desired instants.

In constructing the circuit of FIG. 9, the latches 194 and 203 may be identical to the latch 162 of FIG. 8. The inverter 180 and inverter 196 may each be hex-inverters such as an inverter of the type SN5404 manufactured by Texas Instruments Incorporated. The one-shots 181 and 182 are monostable multivibrators and may be of the type SN54121 available from Texas Instruments Incorporated.

Figure 10:
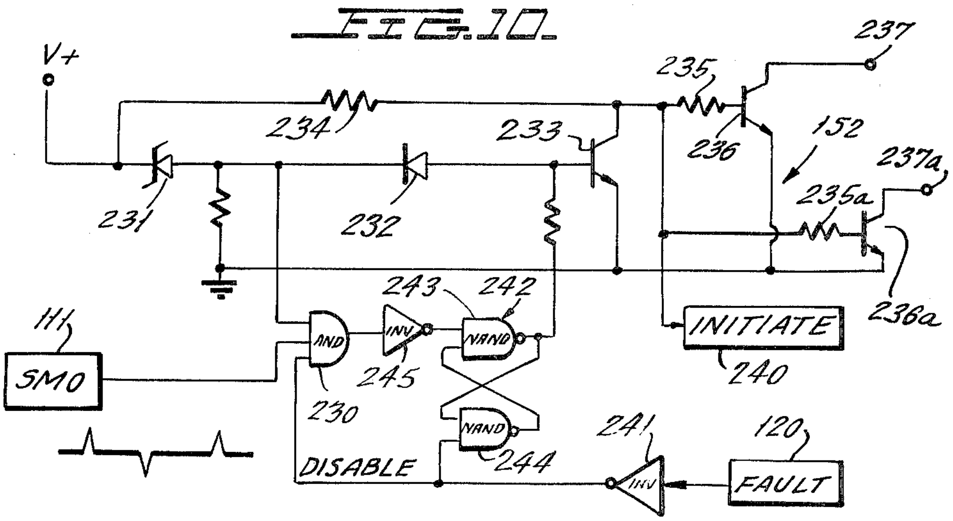
FIG. 10 is a circuit diagram of the converter start-up and turn-off sequence control circuit of FIG. 6.

In order to insure that the variable amplitude control circuit will be properly synchronized during start-up condition and will be properly turned off, each before the source of control voltage V+ decreases below the level required for proper operation of the integrated circuits, a novel start-up and turn-off sequence circuit 152 is provided as shown in FIG. 10. In the circuit of FIG. 10, the synchronizing circuit 111 provides one input to the three input AND gate 230. A source of control voltage V+ is then connected to the zener diode 231 and the anode of zener diode 231 is connected to a second input of AND gate 230. The zener diode is also connected to diode 232 and to the base of transistor 233. The voltage V+ is also connected through resistor 234 to the collector of transistor 233 and through resistor 235 to the base of transistor 236.

The collector of transistor 236 is connected to a terminal 237 which is directly connected to terminal 238 and transistor **236*a* has its collector connected to terminal 237*a* which is directly connected to terminal 239 in FIG. 9 at the bases of transistors 210 and 211, respectively. As will be later seen, the voltage at the node of resistors 234 and 235 (schematically labeled as initiate circuit 240) is connected to activate the lamp-striking sequence circuit 150**.

The third input of the AND gate 230 includes an input from the load fault detection circuit 120 which is connected through an inverter 241. The output of inverter 241 is also connected to one input of latch 242 which consists of NAND circuits 243 and 244.

The output of the three-terminal AND gate 230 is then connected through inverter 245 to the other input of the latch 242.

In constructing the circuit, the latch 242 may be similar to latch 162 of FIG. 8. Similarly, inverters 241 and 245 may be similar to the inverter 180 of FIG. 9. The three-terminal AND gate 230 may be of the type SN54H11 available from Texas Instruments Incorporated.

Figure 11:
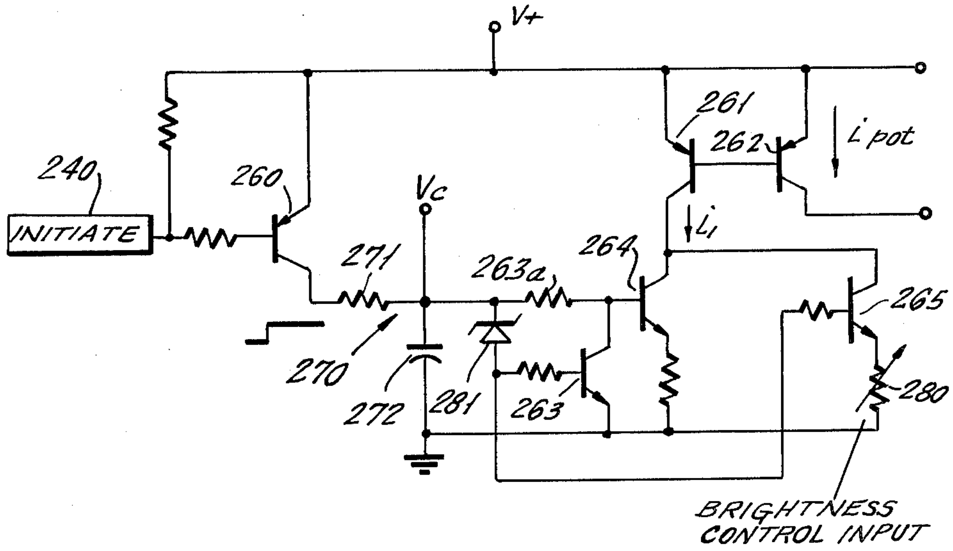
FIG. 11 is a circuit diagram of the lamp striking sequence control circuit of FIG. 6.

The circuit of FIG. 11 insures a proper start-up sequence for the converter. Thus, it is necessary that the supply voltage V+ for all of the integrated circuits in the system be at a high enough level that the integrated circuits will work properly since, when logic gates do not have enough supply voltage, they will false trigger or they will not work at all.

Once the voltage V+ reaches its desired level, it is next necessary that the activation time of the main switching devices 52 and 53 of FIG. 7 be synchronized to the output of the synchronizing circuit 111 to insure turn-on of the right power device at the right time. Similarly, during a turn-off operation, turn-off must be accomplished before V+ goes below the level required by the integrated circuits for their proper operation.

The circuit of FIG. 10 insures this proper operation. Thus, during start-up, once the voltage V+ of the power supply goes above the break-over voltage of zener diode 231, the zener diode 231 conducts and provides a logic 1 input to the AND gate 230. Assuming that no fault is measured by the fault monitoring circuit 120, a logic 1 input is applied by inverter 241 to the second terminal of the AND gate 230.

Now, when a pulse appears from the synchronizing circuit 111, the AND gate 230 produces an activating pulse for the latch 242 and turns on transistor 233. When transistor 233 turns on, the base of transistors 236 and 236a are shorted and the transistors, which normally conduct, are turned off. Note that, so long as transistors 236 and 236a conduct, terminals 237 and 237a are connected to ground so that the bases of transistors 210 and 211 of FIG. 9 are connected to ground and an output pulse cannot be produced in transformers 212 and 213. However, once the transistors 236 and 236a turn off in FIG. 10, the drive circuitry of FIG. 9 is no longer shut down and the converter can begin operating. Moreover, the converter operation will be in proper synchronism with the line current and the proper devices will be turned on in their turn.

During turn-off, the voltage V+ will eventually go below the zener diode voltage and the zener diode 231 will stop conducting. At this point, transistor 233 turns off so that transistors 236 and 236a will turn on. Note that this occurs even though the voltage V+ is below the zener diode voltage. However, the voltage V+ is still high enough to activate the transistors 236 and 236a in order to shut the converter off without mishap. Consequently, the criterion 5 discussed above is met.

The next circuit control to be discussed is the lamp-striking sequence circuit 150 which is shown in detail in FIG. 11. The lamp-striking sequence circuitry insures that, when the system turns on, the output converter voltage will increase slowly so that the lamp voltage will increase slowly until the lamps strike. This slow start-up gives very reliable and non-destructive striking of the lamps and, once the lamps are on, the circuit is deactivated and the brightness control circuit will take over in a smooth fashion.

The lamp-striking sequence circuit 150 of FIG. 11 is initiated by the initiate signal from the circuit 240 of FIG. 10. This can comprise a direct connection to the node of resistors 234 and 235 in the circuit of FIG. 10. Thus, when the voltage V+ is increased to the desired level and the transistor 236 is turned off, the output signal 240 actuates the lamp-striking sequence circuit.

The initiate circuit 240 is connected to a circuit which includes transistors 260, 261, 262, 263, 264 through resistor 263a and transistor 265. It is to be noted that the transistor 262 in FIG. 11 takes the place of the adjustable resistor 186 of FIG. 9. FIG. 11 further includes an integrator circuit 270 consisting of resistor 271 and capacitor 272 where the integrator output is connected to the base of transistor 264.

A brightness control input circuit consisting of potentiometer 280 is connected to transistor 265 and to the remainder of the circuit as indicated and the potentiometer 280 ultimately controls the dimming of the lamp system. Potentiometer 280 can be replaced by any desired control or sensing elements used to cause the dimming operation during the normal lamp operation.

In the circuit of FIG. 11, a variation of the current $i_{POT}$ of transistor 262 has the same effect as the variation of the resistance of variable resistor 186 in FIG. 9. Thus, variation of the current $i_{POT}$ will change delay time in the firing of thyristors 52 and 53 to achieve the desired phase control. In the circuit of FIG. 11, transistors 261 and 262 act as a so-called current mirror circuit. A current mirror circuit is well known and operates such that the current $i_1$ through transistor 261 will equal $i_{POT}$ in FIG. 11.

When the power switch for turning on the converter is turned on, the initiate signal from circuit 240 turns on transistor 260. This provides a step-shaped input to the integrator 270 so that the voltage at node $V_c$ ramps up. This ramp is then applied to the emitter follower transistor 264 and forces the current $I_1$ to ramp up. This in turn causes $i_{POT}$ to ramp up as well. As $i_{POT}$ increases, the delay time for the circuit decreases and, therefore, the output amplitude of the converter increases but at a slow controlled rate.

Once the ramp voltage $V_c$ becomes sufficiently high, the zener diode 281 conducts and causes transistor 263 to clamp off transistor 264. At the same time, transistor 265 is turned on so that the brightness control circuit, under the influence of adjustable resistor 280 takes control of the system. Note that the output voltage increase was smooth and adjustable to cause reliable and nondestructive striking of the lamps.

The novel circuit of the invention is further provided with various protective circuit features. These include the functional blocks shown in FIG. 6 for the converter fault detector 100, the shut-down circuit with automatic reset 103, the load fault detection cicuit 120 and the shut-down circuit with manual reset 123. This protective circuitry is described in detail in FIG. 12, in part, in FIG. 7.

Figure 12:
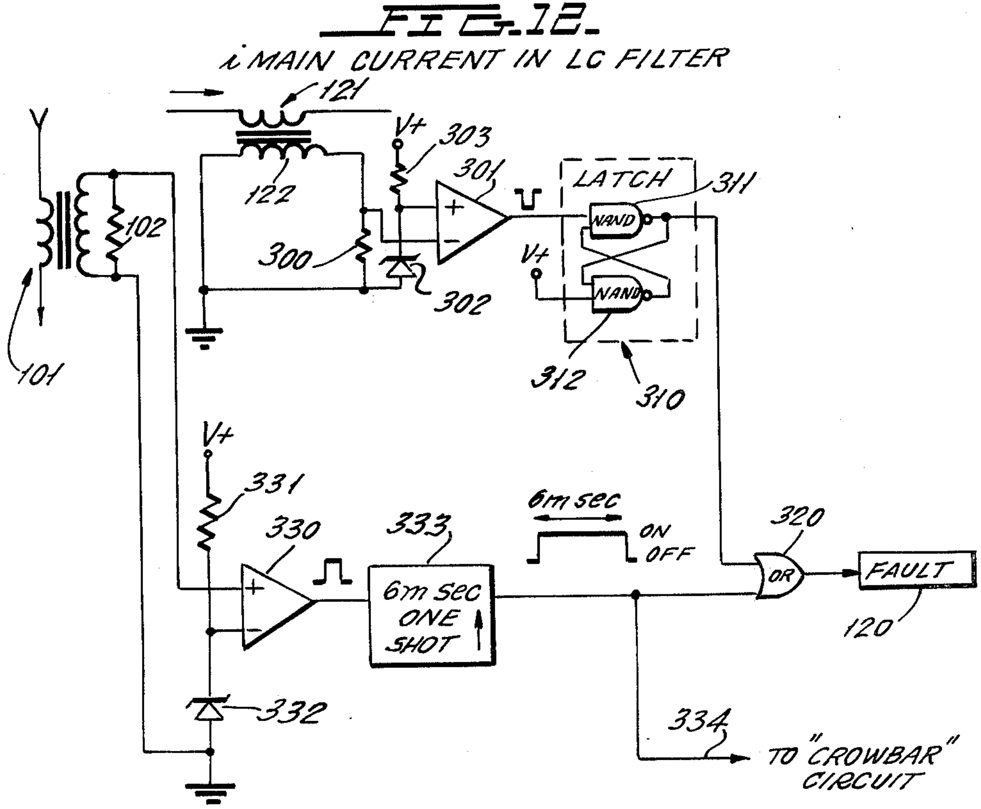
FIG. 12 is a circuit diagram of the protective circuit components of FIG. 6.

Referring to FIG. 12, the current transformer 121 is illustrated and its secondary winding 122 is shown with a burden resistor 300. The output on burden resistor 300 is then connected to one terminal of comparator 301 and the other terminal of comparator 301 is connected to zener diode 302 which is, in turn, connected to a resistor 303 and a terminal connected to the voltage V+.

The output of comparator 301 is then connected to a latch 310 consisting of the NAND gates 311 and 312. The other input to the latch 310 is connected to the voltage V+. The output of the latch 310 is connected to one input of OR circuit 320.

FIG. 12 also shows an input from the converter fault detection system including current transformer 101 and the burden resistor 102 shown in FIG. 7. In FIG. 12, the output of burden resistor 102 is then connected to one terminal of comparator 330 whose other terminal is connected to zener 332. Zener 332 is, in turn, connected to resistor 331 which is connected to the voltage V+.

The output of comparator 330 is then connected to a monostable multivibrator 333 which can, for example, turn on for some non-critical period such as 6 milliseconds when the one-shot 333 receives an output from comparator 330. The output of the one-shot 333 is connected to the other terminal of OR gate 320 and may also have an output designated as the output 334 to a "crowbar" or short-circuiting type device which could temporarily short-circuit the output terminals 50–51 in FIG. 1 for the duration of the output of the one-shot 333. This will prevent damage to circuit components in case of a temporary converter fault, and further is arranged so that the converter can be returned to operation automatically.

The output of the OR gate 320 is then connected to a fault detector circuit 120 which was previously described in FIG. 10, where the output of the OR gate 320 can be connected directly to the input of inverter 241 in FIG. 10.

In the circuit of FIG. 12, the latch 310 may be the same as the latches previously described and similarly inverter 301 and OR gate 320 may be similar to those previously described. The comparators 301 and 330 can be of any desired type and, for example, can be type LM139 devices.

The operation of the protective circuitry of FIG. 12 is as follows:

The comparator 301 is set so that it will trip at a lower level than comparator 330. If there is a fault in the load circuit, the peak value of the main current in current transformer 121 will be the same as the peak value of the current in the primary winding of current transformer 101. Thus, the main current will increase until comparator 301 is tripped. This will then cause the latch 310 to operate and a signal is produced through the OR gate 320 to the fault output circuit 120 which, in turn, produces a signal in FIG. 10 which initiates the turn-off sequence of operation in FIG. 10.

Once the converter is turned off, the latch 310 must be manually reset (the reset circuitry is not shown) in order to turn the converter on again. Manual reset is desirable for a load current fault because the converter should not continue to supply power until the user corrects the fault condition.

In the event that a fault exists within the converter, as contrasted to within the load circuit, the main current through current transformer 121 will be much less than the current in the current transformer 101. Therefore, even though the comparator 330 is set to a higher trip level than comparator 301, the comparator 330 is the first to trip. Comparator 330 then activates the 6 millisecond one-shot 333 which produces an output to the fault circuit 120. This signal removes the input from inverter 241 to AND gate 230 which turns off the circuit of FIG. 11. At the same time, the operation of the one-shot 333 can activate circuits for clearing the converter fault before the base drive comes back again at the end of the 6 milliseconds. For example, a well-known crossbar circuit which is connected across the main d-c bus can be closed to clear any temporary fault within the converter circuit. At the end of the 6 milliseconds, the one-shot 333 turns off so that the base drive in the circuit of FIG. 10 goes on and a reset pulse is applied to the synchronizing circuit 111 through the fault connection circuit to turn on the 100 Hz train to restart the inverter.

Consequently, the auto-reset is achieved following a converter type fault. It should be noted that a converter fault is a transient phenomena which happens on rare occasions and, once the transient fault is removed, the converter should be returned immediately to service.

Figure 13:
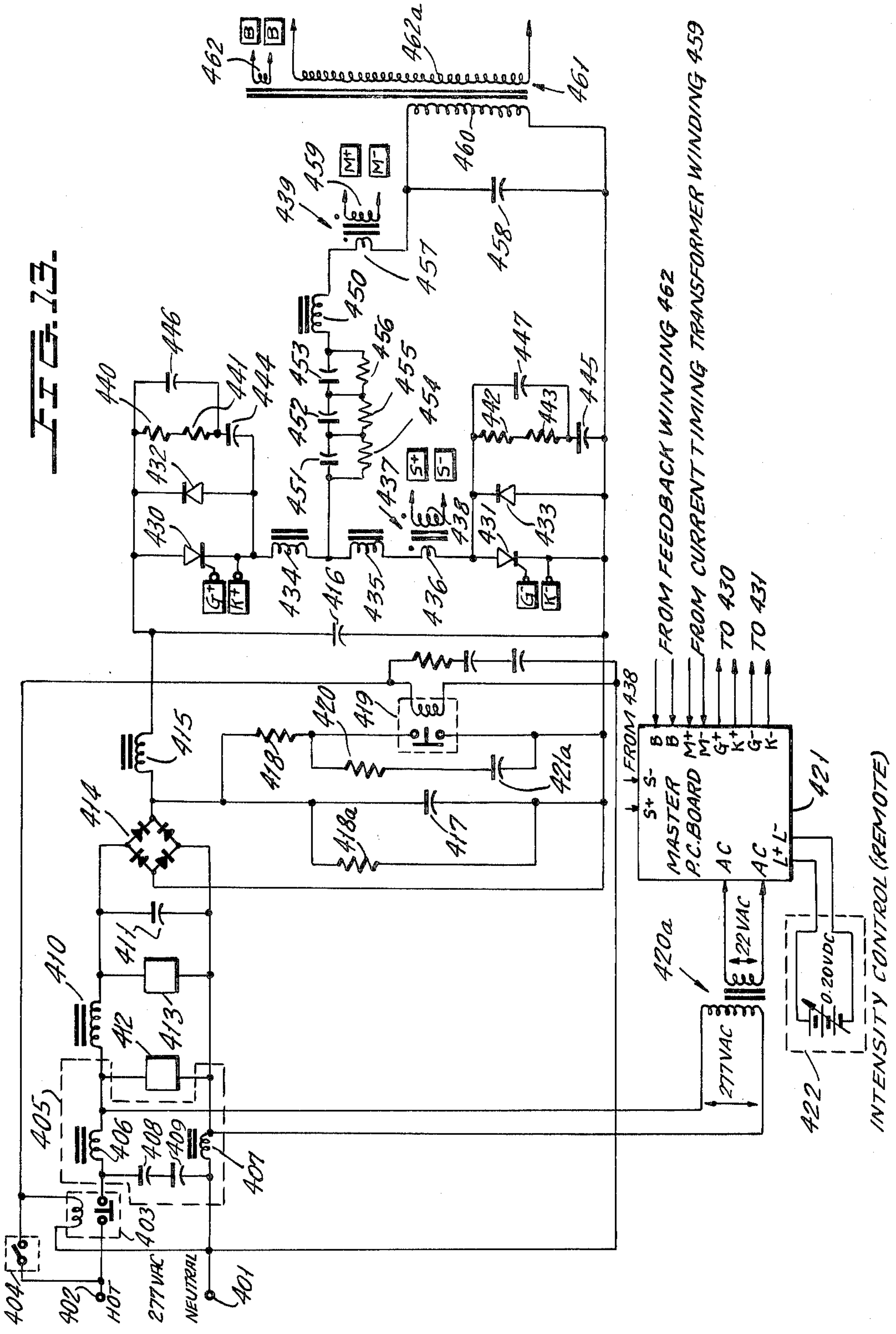
FIG. 13 shows the full power circuit of one specific embodiment of the invention.

FIG. 13 shows one particular circuit for a power module which has been used to carry out the concepts of the present invention as previously described in connection with the preceding figures. It will be apparent to those skilled in the art that the present invention could be carried out with many other types of circuit configurations and the details shown in the power module configuration of FIG. 13 simply illustrate one particular arrangement which could be used.

In FIG. 13, a power input circuit is shown wherein 277 volts a-c is connected between neutral terminal 401 and a hot terminal 402. An on/off relay 403 is contained in the hot line and is associated with a remote switch 404 which acts as the manual reset switch for turning the inverter on after the inverter has been turned off for any reason. The input power is then connected to the radio frequency interference reduction network 405 which consists of a 100 microhenry choke 406, a 100 microhenry choke 407, and two 0.22 microfarad capacitors 408 and 409. The circuit then proceeds to power factor correction choke 410 which is a 30 millihenry choke and capacitor 411 which is a 10 microfarad capacitor. Two metal-oxide varistors 412 and 413 are provided to protect against large voltage transients.

A single phase, full wave bridge-connected rectifier 414 has its d-c output connected to a 1 millihenry choke 415 which cooperates with a capacitor 416 which is a 5 microfarad capacitor and operate in connection with the converter fault-detection circuits as will be later described.

The output of the rectifier 414 is also connected to the electrolytic capacitor 417 which has a parallel-connected 150 kilohm resistor **418*a* where capacitor 417 operates in the power factor network. Capacitor 417** is 1600 microfarads.

The output of rectifier 414 is also connected through a 1.2 kilohm resistor 418 to a safety relay 419 which has contacts connected in parallel with resistor 420, which is a 75 ohm resistor, and capacitor **421*a*, which is a 0.22 microfarad capacitor. Safety relay 419 has contacts which operate to discharge capacitor 417 when power is removed to prevent dangerous shock to maintenance personnel. The winding of relay 419 is connected in series with the remote switch 404 and is provided with parallel resistors and capacitors which act as a relay coil snubber for the relay coils of relays 403 and 419. Also provided with the input power circuit for the inverter which has been described hereinabove is a controlled power transformer 420*a* which applies 22 volts a-c as the control power for a master printed circuit control board 421** which has the numerous input and output terminals schematically illustrated.

A remote intensity control circuit 422 which can consist of a d-c source variable from 0 to 20 volts d-c is connected to the master printed circuit control board 421 to effect control of the output amplitude of the inverter to be described and to effect other control functions.

The main inverter circuit proper consists of the two power switching devices or controllably conductive devices consisting of thyristors 430 and 431 connected in series with one another. Anti-parallel connected diodes 432 and 433 are in parallel with thyristors 430 and 431, respectively. Obviously, thyristors 430 and 431 corrspond to thyristors 52 and 53 of FIG. 3 and diodes 432 and 433 correspond to diodes 59 and 60, respectively, of FIG. 3.

Two rate-of-change of current snubbers comprising chokes 434 and 435 which are each 12 microhenry chokes are provided for each of devices 430 and 431, respectively. The primary winding 436 of a converter fault detector transformer 437 is also provided in the power device series circuit. The output of high voltage secondary winding 438 will be set for a higher trip level than the trip level of the output of transformer 439 which acts as both the load fault detector and as an input the zero-cross detector circuit as will be later described.

Each of thyristors 430 and 431 are further provided with rate-of-rise of voltage snubber circuits including 47 ohm resistors 440–441 and 442–443, respectively, 0.01 microfarad capacitors 444 and 445, respectively, and 750 picofarad capacitors 446 and 447, respectively.

The turned circuit connected to the thyristors 430 and 431, in accordance with the invention, includes the 125 microhenry choke 450 and the series capacitor consisting of the three 1 microfarad capacitors 451, 452 and 453. One megohm resistors 454, 455 and 456 are connected in parallel with capacitors 151 to 153, respectively.

The output current of the tuned circuit is then connected to the primary winding 457 of transformer 439 and to the load buffer capacitor 458 which may be a 2 microfarad capacitor. The output winding 459 of transformer 439 produces the output related to the load fault current, if any, and produces an output for the zero-cross detector circuit.

Load buffer capacitor 458 is then connected to the primary winding 460 of a 1 to 2.8 transformer 461 having a primary output winding 462*a* which is connected to the transmission line which brings power to the individual ballasts. Winding 460 has an inductance of about 110 microhenrys.

A small output winding 462 having a ratio of 1 to 8 with the primary winding 461 is also provided to provide voltage feedback to operational amplifiers which will be later described in order to maintain a constant output voltage under steady state conditions.

As previously mentioned, inductor 415 and capacitor 416 operate in connection with a converter fault control circuit. These components work in conjunction with inductors 434 and 435. The typical converter fault occurs when, for some reason, both thyristors 430 and 431 conduct at the same time so that there is a direct connection across the input power circuit. When this happens, however, inductors 434 and 435 are in the circuit and will ring or oscillate with the capacitor 416. Under this condition, inductor 415 presents a high impedance to the input circuit and permits the ringing of capacitor 416 with inductors 434 and 435 to permit the reverse-biasing of the thyristors 430 and 431 and thus permitting the turn off of thyristors 430 and 431. In all other respects, the circuit shown in FIG. 13 will operate in precisely the manner which has been previously disclosed in connection with the prior drawings.

Figure 14A:
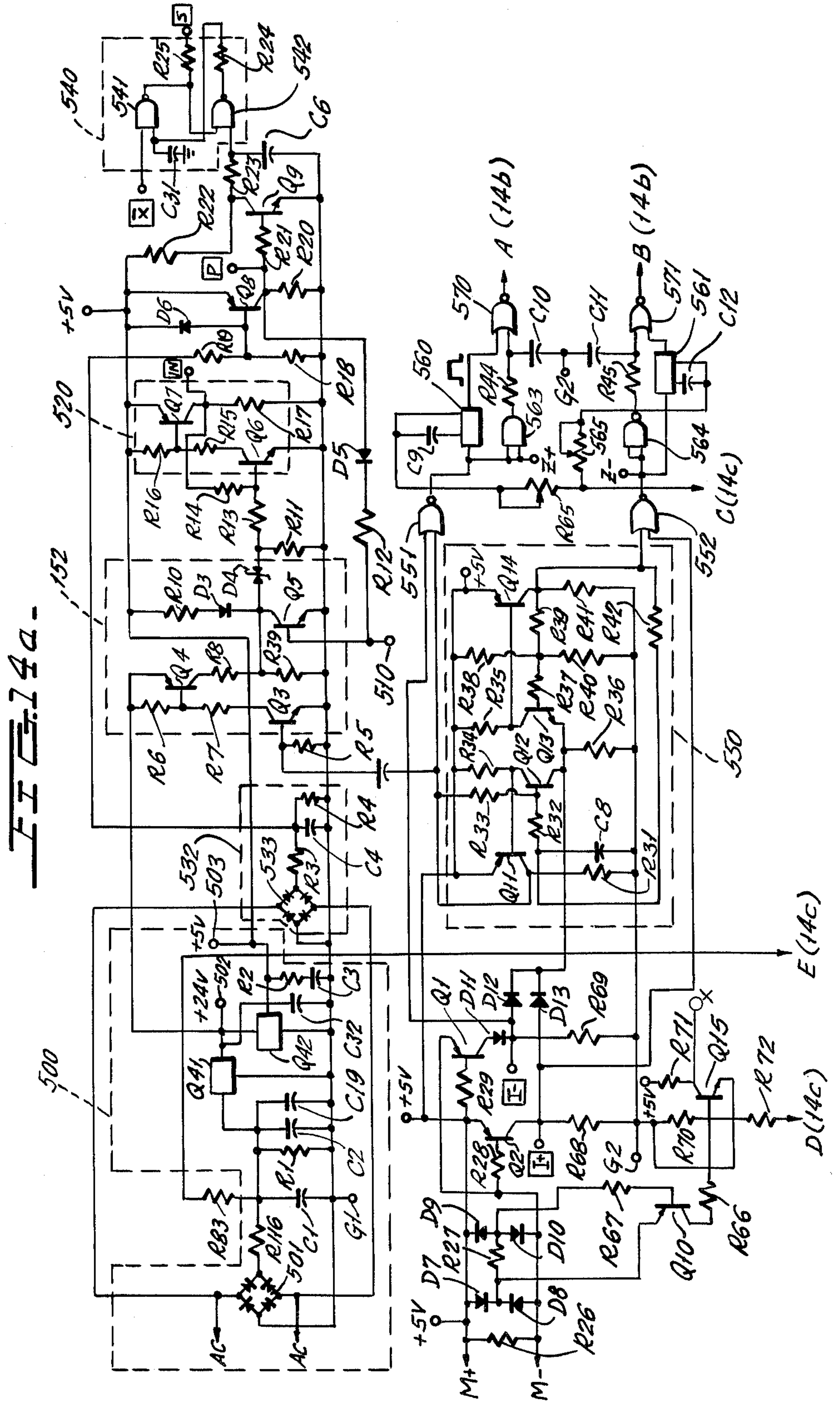
FIGS. 14*a*, 14*b* and 14*c* show a control circuit for the circuit of FIG. 13.
Figure 14B:
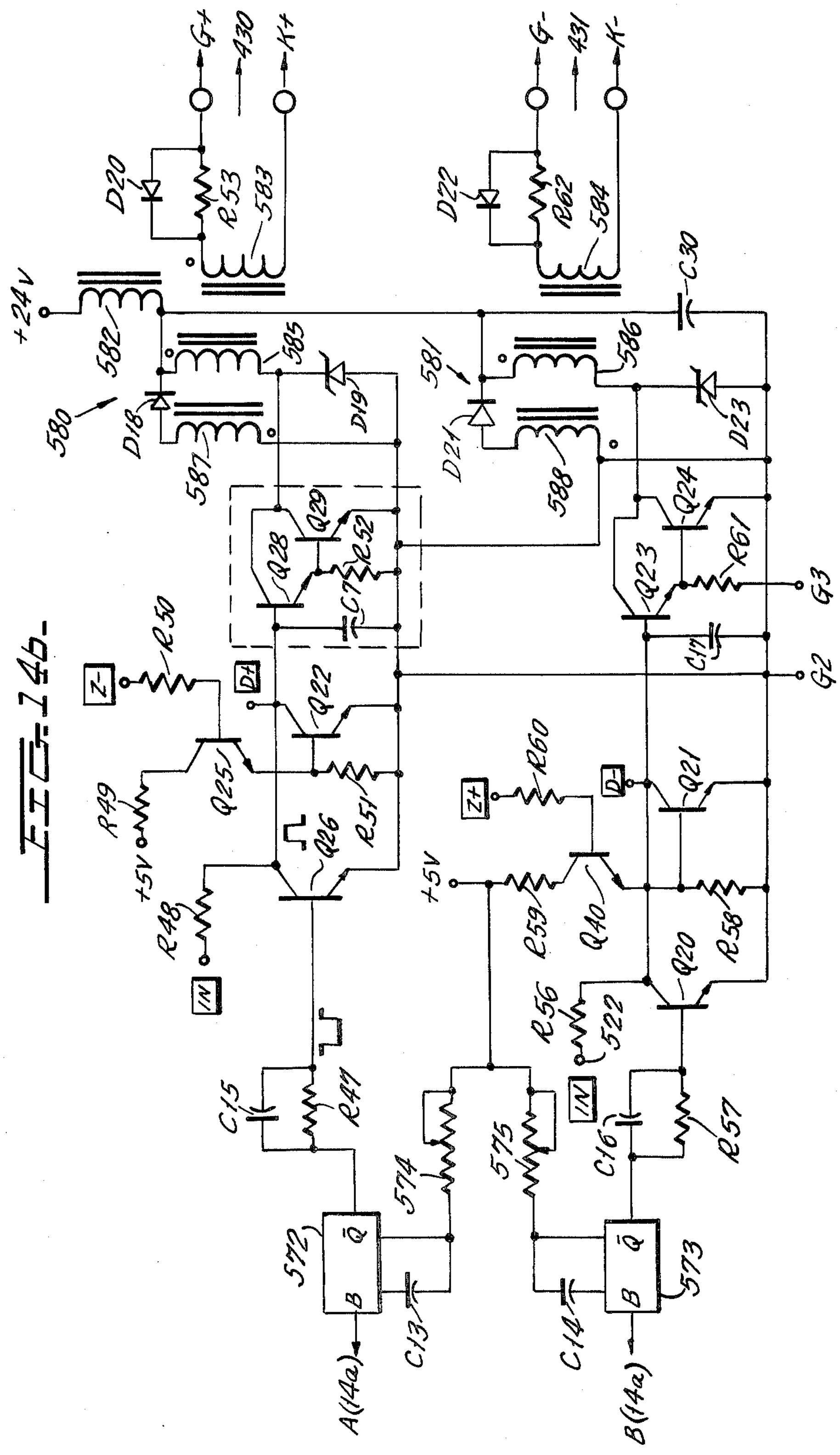
Figure 14C:
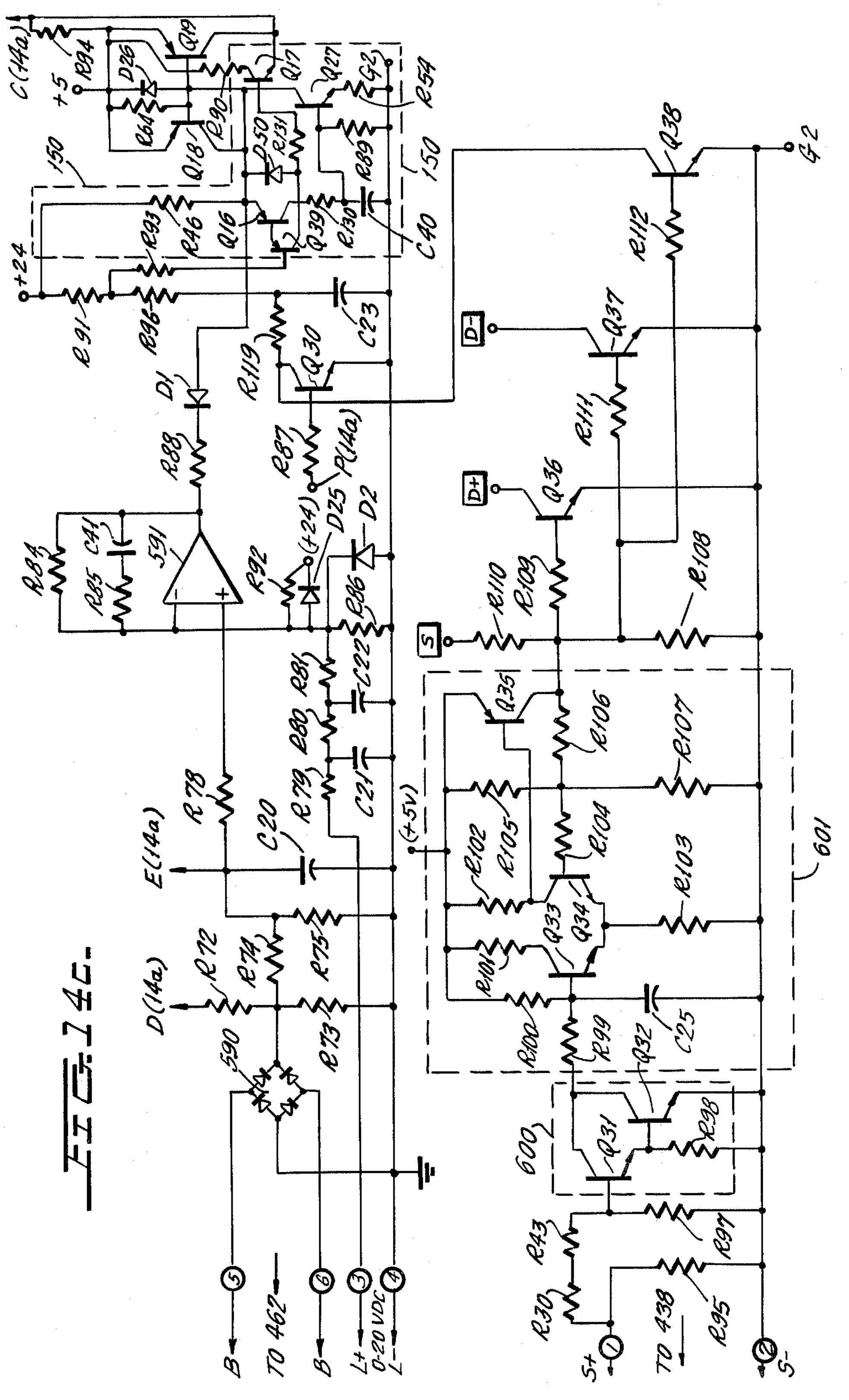

FIGS. 14*a*, 14*b* and 14*c* show a single circuit in conveniently separated sections and are to be connected at arrows designated with a letter followed by the figure to which they are joined. FIGS. 14*a*, 14*b* and 14*c* show the details of the master printed circuit control board 421 which produces all of the control functions for the firing of the main controlled rectifier devices 430 and 431 and other control functions of the circuit of the invention. All terminals are consistently given the same letter identification in FIGS. 13, 14*a*, 14*b* and 14*c*.

The power supply to the control circuit of FIG. 14*a* is connected to the two a-c terminals and consists of the block 500 shown in the upper left-hand corner of FIG. 14*a*. This power supply includes a single phase, full wave bridge-connected rectifier 501 whose output is connected in series with resistor R116 and through filter and bleeder components R1 and C1. The circuit continues through transient limiting capacitors C2 and C19 to a regulator chip Q41 which may be of the type LM340K and produces a 24 volt output at terminal 502 which is connected to capacitor C32. The output of chip Q41 is connected to chip Q42 which may be a type LM309 and produces a regulated output of 5 volts at terminal 503. Terminal 503 is connected to resistor R2 and capacitor C3.

The next block to be described in the circuit of FIG. 14*a* is the start-up circuit 152. The start-up circuit 152 consists of amplifier transistor Q3 and Q4 with their coupling resistors R6 and R7 and R8 and R9, respectively, which are coupled to the turn-off transistor Q5 which has its collector terminal connected to resistor R10 and diode D3. The collector is also connected to a silicon bilateral switch (SBS) D4 where resistor R10, diode D3 and SBS D4 act as a latch-up circuit. As will be later shown, a 100 Hz start-up signal is applied to the base of transistor Q3 with resistor R5 and capacitor C5 acting as a differentiator so that start-up will occur on the leading edge of each of the 100 Hz pulses. Restart-up signals for restarting the start-up sequence circuit 152 can also be applied to the terminal S (terminal 510) and can be taken from the secondary winding 438 in FIG. 13. It is to be noted that the start-up circuit 152 previously described functions to prevent the application of a gate pulse to controlled rectifiers 430 or 431 of FIG. 13 until 5 volts appears at the output terminal 503 of the power supply 500. This then assumes that all of the logic of the control circuit is functioning (since all components use the 5 volts of the power supply) so that turn-on can occur at the proper time.

SBS D4 of circuit 152 is, in FIG. 14*a*, connected to resistors R11, R13, R14 to a latch-amplifier and inverter circuit 520. Circuit 520 consists two transistors Q6 and Q7 forming a amplifier. Transistors Q6 and Q7 are interconnected through resistors R15, R16 and R17. This circuit produces 5 volts at terminal "IN" when the circuit is ready for operation and connects the 5 volts to the gate drive circuit which will be later described (terminals 521 and 522). Note that the inverter circuit main devices 430 and 431 cannot turn on until this 5 volt level at terminal "IN" is available.

The upper portion of the circuit of FIG. 14*a* also contains a fast turn-off circuit 532 consisting of the single phase, full wave diode bridge 533, resistor R3, capacitor C4 and resistor R4. The fast turn-off circuit 532 operates to reset all components when power is interrupted for any reason. Thus, the capacitor C4 operates to turn on transistor Q8 to initiate the fast turn-off process. The base of transistor Q8 is connected to diode D6 and resistor R18 and transistor Q8 functions such that it turns on if the control voltage is too low. This will then turn on transistor Q5 which in turn turns off the voltage at the terminal "IN". The output of transistor Q8 is connected to a terminal "P" which turns off the voltage "IN" during the shut-down sequence.

The output of transistor Q8 is also connected to resistor R20 and R21 and to the base of transistor Q9. Transistor Q9 is in the manual reset circuit and turns off the latch circuit 540 when necessary. Transistor Q9 is associated with resistors R22, R23 and capacitor C6 which are connected to latch circuit 540. The latch circuit 540 consists of gates 541 and 542 which are associated with resistors R24 and R25 and capacitor C31. The input "$\overline{X}$" to gate 541 is taken from the load fault monitor circuit as will be later described. The latch 540 turns on in order to turn off the controlled rectifiers 430 and 431 of FIG. 13 by producing an output at output terminal "S" to turn on transistor Q5, thereby to turn off the voltage at terminal "IN".

FIG. 14*a* shows inputs from terminals M+ and M− which are the output terminals of the current transformer winding 459 of FIG. 13. The signal from winding 459 is connected to the resistor R26 and then to the bridge-connected diodes D7, D8, D9 and D10 which clip the high output voltage of the current transformer to produce what is, in effect, a square wave output pulse which is exactly in phase with the input current. When the current through resistor R27 is sufficiently high, the transistor Q10 becomes conductive and shuts down the circuit.

A base resistor R67 is connected to transistor Q10 and the output of the collector of transistor Q10 is connected through resistor R66 and will be later described hereinafter.

The clipped square wave output of diodes D7, D8, D9 and D10 is connected to resistor R28 and to resistor R29 which are in turn connected to the bases of transistors Q2 and Q1, respectively. Transistor Q1 is the switching device which is responsive to negative-going signals while transistor Q2 is responsive to positive-going signals. Transistor Q1 produces an output signal through diode D11 to terminal "I−" while transistor Q2 produces an output at terminal "I+". Each of these terminals are connected through resistors R68 and R69 to the ground terminal G2 which is a second ground for the circuit. Note that ground 1 for the power supply is the terminal G1 in the power supply segment 500 which is connected immediately below capacitor C1. There are other grounds, G2, G3 and the chassis ground in the system.

The potential at terminal "I+" is connected through the diode D13 while the potential at terminal "I−" is connected through diode D12 to the 100 Hz oscillator 550. The 100 Hz oscillator 550 contains transistors Q11, Q12, Q13 and Q14 which are interconnected through resistors R31, R32, R33, R34, R35, R36, R37, R38, R39, R40, R41 and R42 and capacitor C8. Note that an input from either terminal "I−" or "I+" will turn off the 100 Hz oscillator.

The output of the 100 Hz oscillator is applied to the transistor Q3 as previously described and is also applied to one input of gate 551 which may be a type 74L02 NOR gate. The other input of NOR gate 551 receives the zero-cross signal from terminal "I−" which is produced at the junction between diodes D11 and D12 (the negative-going signal). The 100 Hz start-up signal is also applied to one terminal of gate 552 while the other input of gate 552 receives the positive-going zero-cross signal from terminal "I+".

The outputs of gates 551 and 552 are then connected to one-shot delay circuits including one-shots 560 and 561 and capacitors C9 and C12, respectively. Each of the one-shot delay circuits 74LS123 are further associated with gates 563 and 564, respectively, which act as lockouts against false firing. Note that each of the gates 563 and 564 have an input terminal "Z+" and "Z−" respectively. Note further that capacitor C12 is connected to a variable resistor 565 which is variable from 0 to 50 kilohms.

The output of gates 563 and 564 are connected through resistors R44 and R45, respectively, to respective capacitors C10 and C11 which have their junctions connected to the ground G2. Capacitors C10 and C11 are further connected to inputs of gates 570 and 571, respectively, which may be type 74L02 gates which have their other outputs connected to the one-shot delay circuits 560 and 561, respectively.

The output of gates 570 and 571 are as shown in FIG. 14*b* connected to respective one-shots 572 and 573, respectively, which are each type 74LS123 which produce measured gate pulses in response to the falling edge of the one-shot pulse from the one-shots 560 and 561, respectively. Each of one-shots 572 and 573 are associated with capacitors C13 and C14, respectively, and adjustable resistors 574 and 575, respectively, which are adjustable from 0 to 50 kilohms.

The output of one-shots 572 and 573 are then connected through capacitors C15 and C16, respectively and resistors R47 and R57, respectively, to the base of transistors Q26 and Q20, respectively. The collector of each of the gates of transistors Q26 and Q20 are connected to terminal "IN" which provide 5 volts from the power supply, when 5 volts is available, through resistors R48 and R56, respectively. Both transistors Q26 and Q20 operate as inverters and are connected to the bases of transistors Q28 and Q23, respectively. Note that these bases are also connected to the potential of points "D+" and "D−", respectively.

In parallel with transistors 26 and 20 are futher transistors Q22 and Q21, respectively, which are associated with resistors R51 and R58, respectively. Resistors R51 and R58 are in turn connected to the +5 volt source through resistors 49 and 59, respectively, and transistors Q25 and Q40, respectively. Transistors 21 and 22 operate to short out the firing circuit for one of the main thyristors 430 or 431 of FIG. 13 while the other main thyristor is conducting. This prevents the turn on of both switches or thyristors at the same time which would create a converter fault. Note that the control voltage is applied to the base of transistors Q25 and Q40 through resistors R50 and R60, respectively.

Each of transistors Q28 and Q23 are associated with capacitors C7 and C17, respectively, and resistors R52 and R61, respectively, and are connected in a Darlington-type switching circuit arrangement with transistors Q29 and Q24, respectively. The Darlington switching arrangement is connected to the pulse transformers 580 and 581, respectively, which consist of primary transformer windings 585 and 586, respectively, and auxiliary windings 587 and 588, respectively. Windings 587 and 588 are in series with diodes D18 and D21, respectively, connected as shown. Zener diodes D19 and D23 are connected across transistors Q29 and Q24, respectively. The auxiliary windings 587 and 588 are used to clamp the primary negative voltage and thus provide the proper amplitude and duration of negative bias to the corresponding thyristor in oder to enhance its rate of rise of voltage capability.

A 24 volt source is connected to the pulse transformer windings through the filter circuit consisting of choke 582 which is a 1 millihenry choke and the capacitor C30. Each of the pulse transformer windings 580 and 581 then have respective secondary windings 583 and 584 which are connected, through resistors R53 and R62, respectively, which are each 10-watt resistors to the terminals "G+" and "K+" of thyristor 430 and to terminals "G−" and "K−" of thyristor 431. Each of resistors R53 and R63 are provided with parallel-connected diodes D20 and D22, respectively.

Turning next to FIG. 14c, terminals B—B which are connected to the feedback winding 462 in FIG. 13 are provided to detect an open load circuit by detecting an increase in the load voltage beyond a predetermined level. These terminals are connected to a single phase, bridge connected rectifier 590 whereby the appearance of an open circuit voltage will turn on the transistor Q15 through the circuit including resistor R72 and resistor R70. Transistor Q15 is provided with an input resistor R71 and is connected to terminal "X" which is the terminal associated with the load fault monitor circuit.

The output voltage of bridge connected rectifier 590 is also connected to an attentuator and RMS detector circuit consisting of resistors R73, R74, R75 and capacitor C20. The output of this circuit is then connected to one input of an error amplifier 591 which is of the type LM324 through resistor R78. The source of control voltage from terminals "L+" and "L−" is also connected to the error amplifier 591 through a d-c control voltage filter circuit consisting of resistors R79 and R80 and capacitors C21 and C22. The output of this circuit is connected to the reference input of the error amplifier 591 through the resistor R81. The reference voltage, which will vary as the control signal is varied, is also applied to the parallel circuit consisting of resistors R84 and R85 and capacitor C41 as shown. Also connected to one side of resistor R81 is the resistor R92, the diode D25, resistor R86 and diode D2.

The terminal P is then connected through resistor R87 to the base of transistor Q30 which operates to turn on if the line voltage becomes too low or if power is turned off. Transistor Q30 is associated with resistor R119 and controls the operation of a timing circuit consisting of the input source of 24 volts, resistor R91, resistor R96, ramp capacitor 23 and resistor 93. This timing circuit will operate to charge capacitor C23 slowly when power comes on or when a shoot-through or a fault in which both thyristors 430 and 431 of FIG. 13 conduct, is cleared.

The output of this timing circuit is connected to the previously mentioned lamp-striking sequence circuit 150 which, in FIG. 14c, includes transistors Q39, Q16, Q17 and Q27. These transistors are associated with resistors R46, R130, R131, R89, R54, R90 and capacitor C40. The lamp-striking sequence circuit 150 is then connected to the transistors Q18 and Q19 which, along with resistors R64 and R94, function as a "current mirror". The output current of this circuit is applied to one-shots 560 and 561 and determines the delay time of the one-shots and thus the phase control which is to be applied for the firing of the main thyristors 430 and 431.

During steady state operation, the operational amplifier 591 determines the current which flows into the one-shot delay circuits 560 and 561. When power is turned on, the lamp striking sequence circuit 150 is in command of operational amplifier 591 and transistor Q39 turns on to turn on transistor Q16. This turns off the transistors Q18 and Q19 regardless of the operation of operational amplifier 591. As the ramp capacitor C23 charges, the operational amplifer 591 gradually takes control of transistors Q18 and Q19. However, transistor Q16 must turn off before operational amplifier 591 can begin to take control. When transistor Q27 turns off, operational amplifier 591 will have full control.

The specific arrangement next shown at the bottom of FIG. 14c includes the shut-down circuit 103 previously described. This circuit includes the so-called shoot-through protection circuit connected to terminals "S+" and "S−" from transformer winding 438. These terminals are connected to resistors R95, R30, R43 and R97 which then lead into a comparator circuit 600 which consists of transistors Q31 and Q32 and resistor R98. The comparator 600 functions such that if the input to the circuit is greater than 1.2 volts, the comparator is on, indicating that a signal of sufficient magnitude has been applied between the terminals "S+" and "S−". The comparator signal is then applied to the one-shot 601 which will produce a pulse length of about 6 milliseconds and consists of resistors R99, R100, R101, R102, R103, R104, R105, R106 and R107 and transistors Q33, Q34 and Q35 and capacitor C25. The output of the one-shot is then connected to the circuit including resistors 108, 109 and 110 where the resistor 110 is connected to the voltage of the terminal "S". This is connected to the start-up circuit and turns on Q5 to turn off the control voltage of +5 volts when shut-down is required.

Resistor 109 is then connected to transistor Q36 while resistor 108 is connected to transistor Q37 through resistor 111. The collector of transistors Q36 and Q37 are connected to the potential of the gate drives D+ and D− so that these transistors can clamp off the gate drive to the main controlled rectifiers 430 and 431 during turn-off conditions or during the appearance of a shoot-through signal.

Resistor 108 is further connected through a resistor 112 to transistor Q38 which turns on in response to a shoot-through condition and operates to reset the lamp-striking sequence circuit. Thus, when Q38 turns off, the striking sequence restarts.

In the above-noted circuit, good results were obtained when using component values for the various components as follows:

| RESISTORS | |
|---|---|
| R1 | 4.7K |
| R2 | 5.6 Ω |
| R3 | 10 Ω |
| R4 | 3.3K |
| R5 | 4.7K |
| R6 | 39K |
| R7 | 22K |
| R8 | 6.8K |
| R9 | 5.6K |
| R10 | 1K |
| R11 | 560 Ω |
| R13 | 10K |
| R14 | 220K |
| R15 | 4.7K |
| R16 | 39K |
| R17 | 1K |
| R18 | 10K |
| R19 | 18K |
| R20 | 10K |
| R21 | 10K |
| R22 | 1K |
| R23 | 56 Ω |
| R24 | 1K |
| R25 | 22K |
| R26 | 82 Ω |
| R27 | 0.43 Ω |
| R28 | 470 Ω |
| R29 | 470 Ω |
| R30 | 180 Ω |

-continued

| RESISTORS | |
|---|---|
| R31 | 1K |
| R32 | 120K |
| R33 | 560K |
| R34 | 10K |
| R35 | 10K |
| R36 | 68K |
| R37 | 82K |
| R38 | 68K |
| R39 | 68K |
| R40 | 68K |
| R41 | 1K |
| R42 | 68K |
| R43 | 820 Ω |
| R44 | 1K |
| R45 | 1K |
| R46 | 3.3K |
| R47 | 4.7K |
| R48 | 680 Ω |
| R49 | 8.2K |
| R50 | 39K |
| R51 | 39K |
| R52 | 220 Ω |
| R53 | 30 Ω |
| R54 | 3.3K |
| R56 | 680 Ω |
| R57 | 4.7K |
| R58 | 39K |
| R59 | 8.2K |
| R60 | 39K |
| R61 | 220Ω |
| R62 | 30 Ω |
| R64 | 39K |
| R65 | 0–50 Ω |
| R66 | 3.3K |
| R67 | 56 Ω |
| R68 | 1K |
| R69 | 1K |
| R70 | 1K |
| R71 | 1K |
| R72 | 33K |
| R73 | 1K |
| R74 | 10K |
| R75 | 24.9K |
| R78 | 10K |
| R79 | 1K |
| R80 | 1K |
| R81 | 230K |
| R84 | 470K |
| R85 | 680 Ω |
| R86 | 44.2K |
| R87 | 1.5K |
| R88 | 3.3K |
| R89 | 82K |
| R90 | 82K |
| R91 | 100K |
| R92 | 100K |
| R93 | 150K |
| R94 | 8.2K |
| R95 | 2.7 Ω |
| R96 | 180K |
| R97 | 390 Ω |
| R98 | 390 Ω |
| R99 | 10 Ω |
| R101 | 10K |
| R102 | 10K |
| R103 | 10K |
| R104 | 82K |
| R105 | 68K |
| R106 | 68K |
| R107 | 68K |
| R108 | 1K |
| R109 | 5.6K |
| R110 | 22K |
| R111 | 5.6K |
| R112 | 1.5K |
| R116 | 1 Ω |
| R119 | 56 Ω |
| R130 | 15K |
| R131 | 470K |

| CAPACITORS | |
|---|---|
| C1 | 4000 microfarads |
| C2 | 0.1 microfarad |
| C3 | 0.22 microfarad |
| C4 | 10 microfarads |
| C5 | 330 picofarads |
| C6 | 4.7 microfarads |
| C7 | 330 picofarads |
| C8 | 0.05 microfarad |
| C9 | 1000 picofarads |
| C10 | 500 picofarads |
| C11 | 500 picofarads |
| C13 | 2000 picofarads |
| C14 | 2000 picofarads |
| C15 | 500 picofarads |
| C16 | 500 picofarads |
| C17 | 330 picofarads |
| C19 | 0.1 microfarad |
| C20 | 0.33 microfarad |
| C21 | 0.33 microfarad |
| C22 | 0.33 microfarad |
| C23 | 4.7 microfarads |
| C30 | 100 microfarads |
| C31 | 4700 picofarads |
| C32 | 200 microfarads |
| C40 | 4.7 microfarads |
| C41 | 0.1 microfarad |

| TRANSISTORS | |
|---|---|
| Q1 | 2N4125 |
| Q2 | 2N4125 |
| Q3 | 2N4123 |
| Q4 | 2N4125 |
| Q5 | 2N4123 |
| Q6 | 2N4123 |
| Q7 | 2N4125 |
| Q8 | 2N4125 |
| Q9 | 2N4123 |
| Q10 | 2N4125 |
| Q11 | 2N4125 |
| Q12 | 2N4123 |
| Q13 | 2N4123 |
| Q14 | 2N4125 |
| Q15 | 2N4123 |
| Q16 | 2N4125 |
| Q17 | 2N4123 |
| Q18 | 2N4125 |
| Q19 | 2N4125 |
| Q20 | 2N4123 |
| Q21 | 2N4123 |
| Q22 | 2N4123 |
| Q23 | MPS-A06 |
| Q24 | MJE182 |
| Q25 | 2N4123 |
| Q26 | 2N4123 |
| Q27 | 2N4123 |
| Q28 | MPS-A06 |
| Q29 | MJE182 |
| Q30 | 2N4123 |
| Q31 | MPSA06 |
| Q32 | MPSA06 |
| Q33 | 2N4123 |
| Q34 | 2N4123 |
| Q35 | 2N4125 |
| Q36 | 2N4123 |
| Q37 | 2N4123 |
| Q38 | 2N4123 |
| Q39 | 2N4125 |
| Q40 | 2N4123 |

| DIODES | |
|---|---|
| D1 | IN914 |
| D2 | IN914 |
| D3 | IN914 |
| D4 | MBS4992 |

-continued

| DIODES | |
|---|---|
| D5 | IN914 |
| D6 | IN914 |
| D7 | MR810 |
| D8 | MR810 |
| D9 | MR810 |
| D10 | MR810 |
| D11 | IN914 |
| D12 | IN914 |
| D13 | IN914 |
| D18 | MR811 |
| D19 | IN5261 |
| D20 | MR811 |
| D21 | MR811 |
| D22 | MR811 |
| D23 | IN5261 |
| D25 | IN914 |
| D50 | IN914 |

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A high frequency converter comprising, in combination:

- a d-c input source;
- power switching means including control electrode means for turning on said power switching means at high speed, and producing a square wave output wave form;
- sine wave filter means connected in series with power switching means for producing a sinusoidal wave shape from said square wave output wave form;
- a load buffer network connected to said sine wave filter for connection to a load and maintaining a sinusoidal wave form over a large range of load current;
- a zero crossing detector circuit for producing a output pulse each time the output current of said sine wave filter goes through zero;
- a synchronizing circuit connected to said zero crossing detector and producing an output pulse train at the frequency of the output current of said sine wave filter means;
- a variable amplitude control circuit coupled to said control electrode means and connected to said synchronizing circuit and producing output pulses to said control electrode means at said frequency of said output current of said sine wave filter means;
- and control circuit means connected to said variable amplitude control circuit for controllably delaying the phasing of said output pulses of said variable amplitude control circuit relative to the current zero time of said output current of said sine wave filter means.

2. The converter of claim 1 wherein said power switching means includes first and second series-connected thyristors which are alternately turned on and off at said frequency of said output current of said sine wave filter means.

3. The converter of claim 1 wherein said sine wave filter means includes a series-connected inductor and capacitor which are resonant at said frequency of said output current of said sine wave filter means.

4. The converter of claim 2 wherein said sine wave filter means includes a series-connected inductor and capacitor which are resonant at said frequency of said output current of said sine wave filter means.

5. The converter of claim 1 wherein said frequency is greater than about 20 kHz.

6. The converter of claim 2, 3, or 4 wherein said frequency is greater than about 20 kHz.

7. The converter of claim 1 wherein said control circuit means includes a condition response control member.

8. The converter of claim 1 wherein said control circuit means includes a manually variable resistor for manually varying the amplitude of the output voltage of said converter.

9. The converter of claim 1 wherein said control circuit means includes lamp striking sequence circuit means for relatively slowly increasing the output voltage of said converter when said converter is turned on.

10. The converter of claim 1 wherein said control circuit means further includes converter start-up and shut-down circuit means for enabling reliable turn-on and turn-off of said converter by delaying the application of firing pulses to said control electrode means until control voltages are properly established.

11. The converter of claim 1 which further includes first fault detector circuit means for detecting a fault in said converter, and shut-down circuit means connected between said first fault detector circuit means and said variable amplitude control circuit for shutting down said converter in response to a fault in said converter.

12. The converter of claim 11 which further includes automatic reset means connected to said variable amplitude control circuit for automatically reactivating said converter after a given time delay following its shutdown in response to a converter fault.

13. The converter of claim 1 or 12 wherein said control circuit means includes lamp striking sequence circuit means for relatively slowly increasing the output voltage of said converter when said converter is turned on.

14. The converter of claim 12 wherein said control circuit means further includes converter start-up and shut-down circuit means for enabling reliable turn-on and turn-off of said converter by delaying the application of firing pulses to said control electrode means until control voltages are properly established.

15. The converter of claim 11, 12 or 14 which further includes second fault detecter circuit means for detecting a fault in said output current of sine wave filter means and in the load circuit of said converter; and shut-down circuit means connected between said second fault detector circuit means and said variable amplitude control circuit for shutting down said converter in response to a fault in the load circuit of said converter; and manually operable reset means for resetting said converter following the operation of said second fault detector circuit means.

16. An energy-conserving illumination control system consisting of:

- a plurality of passive linear ballasts and respective gas discharge lamps therefor;
- a single high frequency power source including power switching means having control electrode means for turning power on and off at an output frequency in excess of about 20 kHz, and a sine wave filter; said high frequency power source being connected to each of said plurality of passive linear ballasts and lamps;

the output wave shape of said high frequency power source being sinusoidal;

a zero crossing detector circuit for producing an output pulse each time the output current of said sine wave filter goes through zero;

a synchronizing circuit connected to said zero crossing detector circuit and producing an output pulse train at the frequency of the output current of said sine wave filter;

a variable amplitude control circuit coupled to said control electrode means and connected to said synchronizing circuit and producing output pulses to said control electrode means at said frequency of said output current of said sine wave filter;

and control circuit means connected to said variable amplitude control circuit for controllably delaying the phasing of said output pulses of said variable amplitude control circuit relative to the current zero time of said output current of said sine wave filter;

said control circuit means varying the amplitude of the wave shape of the output of said high frequency power source, thereby to vary the light intensity of each of said lamps; the energy consumed by said illumination control system being functionally related to the output light intensity from said plurality of lamps.

17. The system substantially as set forth in claim 16 which includes a high frequency power transmission line for coupling the output of said high frequency power source to each of said plurality of passive linear ballasts.

18. The system substantially as set forth in claim 16 wherein said high frequency power source includes input means connected to a source of relatively low frequency power and converter means for producing said relatively high frequency power from said relative low frequency power source.

19. The system of claim 16 wherein said power switching means includes first and second series-connected thyristors which are alternately turned on and off at said frequency of said output current of said sine wave filter.

20. The system of claim 16 wherein said sine wave filter includes a series-connected inductor and capacitor which are resonant at said frequency of said output current of said sine wave filter.

21. The system of claim 18 wherein said control circuit includes a manually variable resistor for manually varying the amplitude of the output voltage of said converter.

22. The system of claim 18 which further includes first fault detector circuit means for detecting a fault in said converter, and shut-down circuit means connected between said first fault detector circuit means and said variable amplitude control circuit for shutting down said converter in response to a fault in said converter.

23. The system of claim 22 which further includes automatic reset means connected to said variable amplitude control circuit for automatically reactivating said converter after a given time delay following its shutdown in response to said converter fault.

24. The system of claim 18 which further includes second fault detector circuit means for detecting a fault in said output current of sine wave filter and in the load circuit of said converter; and shut-down circuit means connected between said second fault detector circuit means and said variable amplitude control circuit for shutting down said converter in response to a fault in said load circuit; and manually operable reset means for resetting said converter following the operation of said second fault detector circuit means.

25. A high frequency variable amplitude converter circuit comprising, in combination:

first and second series-connected switching means;

a single tuned circuit comprising inductance means and capacitance means tuned to oscillate at a given frequency;

an output lighting circuit;

an input power source connected in series with said first switching means, said tuned circuit and said output lighting circuit;

said second switching means connected in closed series relation with said tuned circuit and said output lighting circuit;

and control circuit means connected to said first and second switching means for closing said first and second switching means in synchronism with the frequency of oscillation of said tuned circuit.

26. The circuit of claim 25 which further includes phase control means for controllably varying the point at which each of said first and second switching means is closed.

27. The circuit of claim 25 which further includes first and second diode means connected in parallel with said first and second switching means; said first and second switching means being adapted to conduct forward current in only one direction; said first and second diodes being adapted to conduct forward current in a direction opposite to said one direction.

28. The circuit of claim 25 wherein said first and second switching means are each thyristors.

29. The circuit of claim 26 which further includes first and second diode means connected in parallel with said first and second switching means; said first and second switching means being adapted to conduct forward current in only one direction; said first and second diodes being adapted to conduct forward current in a direction opposite to said one direction.

30. The circuit of claim 29 wherein said first and second switching means are each thyristors.

31. The circuit of claims 25, 26, 27, 28 or 29 which further includes first fault detector means for detecting the presence of a fault current in said converter circuit and second fault detector means for detecting the presence of a fault in said output lighting circuit, means to deactivate said converter circuit, an automatic reset means connected to said first fault detector means for automatically resetting said means to deactivate said converter circuit; and manual reset means connected to said converter circuit for manually energizing said converter circuit after the operation of said second fault detector.

32. A high frequency variable amplitude converter circuit comprising, in combination:

power switching means including at least one controllably conductive device having a diode connected in parallel therewith;

tuned circuit means connected in series with said power switching means and tuned to oscillate at a given frequency;

an output lighting circuit;

an input power source connected in series with said power switching means, said tuned circuit and said output lighting circuit;

control circuit means connected to said controllably conductive device for turning on said controllably conductive device in synchronism with the frequency of oscillation of said tuned circuit;

and phase control circuit means for controllably varying the point at which said controllably conductive device becomes conductive to vary the output amplitude of said converter circuit.

33. The circuit of claim 32 wherein said controllably conductive device is a thyristor.

34. The circuit of claim 32 or 33 which further includes first fault detector means for detecting the presence of a fault current in said converter circuit and second fault detector means for detecting the presence of a fault in said output lighting circuit, means to deactivate said converter circuit, an automatic reset means connected to said first fault detector means for automatically resetting said means to deactivate said converter circuit; and manual reset means connected to said converter circuit for manually energizing said converter circuit after the operation of said second fault detector means.

35. The device of claim 16 or 32 wherein said control circuit means further includes lamp striking sequence circuit means for relatively slowly increasing the voltage magnitude of said output when said device is initially turned on.

36. An energy-conserving illumination control system comprising:

a plurality of high frequency lighting ballasts which each operate at least one gas discharge lamp;

a self-driven high efficiency single high frequency power source connected to each of said ballasts and including at least one power switching means having a control electrode means for passing power pulses at an output frequency in excess of about 20 kHz;

a zero crossing detector circuit connected to said power source and producing an output pulse each time the output current of said power source goes through zero;

a variable amplitude control circuit connected to said zero crossing detector circuit and connected to said control electrode means for applying control pulses to said control electrode means which are adjustably variable in phase to control the amplitude of the output of said power source while maintaining the frequency of said output of said power source constant, thereby to vary the light intensity of each of said lamps;

and fault detector means connected to the output of said power source to detect a fault in the circuit connected to the output of said power source.

37. The system of claim 36 which further includes a main power transformer connected to said output of said power source.

38. The system of claim 37 wherein each of said ballasts includes a respective filament power transformer sufficient only to provide filament power for the lamps associated with said ballasts.

39. The system of claim 36, 37 or 38 which further includes second fault detector means connected to said at least one power switching means to detect an internal fault within said high frequency power source.

40. An energy-conserving illumination control system comprising:

a plurality of high frequency lighting ballasts which each operate at least one gas discharge lamp;

a self-driven high efficiency single high frequency power source connected to each of said ballasts and including at least one power switching means having a control electrode means for passing power pulses at an output frequency in excess of about 20 kHz;

a zero crossing detector circuit connected to said power source and producing an output pulse each time the output current of said power source goes through zero;

a variable amplitude control circuit connected to said zero crossing detector circuit and connected to said control electrode means for applying control pulses to said control electrode means which are adjustably variable in phase to control the amplitude of the output of said power source while maintaining the frequency of said output of said power source constant, thereby to vary the light intensity of each of said lamps;

and fault detector means connected to said at least one power switching means to detect an internal fault within said high frequency power source.

* * * * *